US011870935B1

(12) United States Patent
Sekar et al.

(10) Patent No.: US 11,870,935 B1
(45) Date of Patent: Jan. 9, 2024

(54) SYSTEMS AND METHODS FOR FACILITATING CUSTOMER-INITIATED INTERACTIONS WITH CONTACT CENTERS VIA MULTIMEDIA CUSTOMER INPUT

(71) Applicant: GENESYS CLOUD SERVICES, INC., Menlo Park, CA (US)

(72) Inventors: Archana Sekar, Chennai (IN); Vinod Natakala Madhavan, Chennai (IN)

(*) Notice: Subject to any disclaimer, the term of this patent is extended or adjusted under 35 U.S.C. 154(b) by 0 days.

(21) Appl. No.: 17/876,753

(22) Filed: Jul. 29, 2022

(51) Int. Cl.
*H04M 3/00* (2006.01)
*H04M 3/523* (2006.01)
*G06Q 30/016* (2023.01)

(52) U.S. Cl.
CPC ........ *H04M 3/5232* (2013.01); *G06Q 30/016* (2013.01)

(58) Field of Classification Search
CPC ................ H04M 3/5232; G06Q 30/016
USPC ....... 379/265.01–265.14, 266.01–266.1, 309
See application file for complete search history.

(56) References Cited

U.S. PATENT DOCUMENTS

| | | | |
|---|---|---|---|
| 9,886,771 B1* | 2/2018 | Chen | .................... G06F 3/04845 |
| 10,319,094 B1 | 6/2019 | Chen et al. | |
| 11,288,789 B1* | 3/2022 | Chen | ....................... G06T 7/001 |
| 11,308,145 B2 | 4/2022 | Sekar et al. | |
| 2022/0358775 A1* | 11/2022 | Hantehzadeh | ........ G06T 3/0093 |

* cited by examiner

*Primary Examiner* — William J Deane, Jr.

(57) ABSTRACT

A method for facilitating an interaction with a contact center for a customer relating to a problem with a target object. The method includes receiving images of the target object from the customer and processing the images by: identifying a base object corresponding to the target object; retrieving a base object model, product identification information, and customer service information associated with the base object; analyzing the images by comparing the images of the target object to the base object model to detect changes; based on the detected changes, determining a problem statement related to the interaction; and based on the customer service information and the problem statement, selecting an applicable contact center as the contact center for the interaction. The method includes transmitting a communication that include the problem statement to the contact center to initiate the interaction.

12 Claims, 10 Drawing Sheets

SYSTEMS AND METHODS FOR FACILITATING CUSTOMER-INITIATED INTERACTIONS WITH CONTACT CENTERS VIA MULTIMEDIA CUSTOMER INPUT

BACKGROUND

The present invention generally relates to the field of customer relations management. More particularly, but not by way of limitation, the present invention pertains to assisting customer via telephone and internet-based service options, including ways to facilitate customer-initiated interactions through applications executed on a mobile computing device and automation implemented via image processing technologies.

BRIEF DESCRIPTION OF THE INVENTION

The present invention includes a method for initiating an interaction for a customer with a contact center. The interaction may relate to a problem the customer is having with a target object. The method may include the steps of: generating, in response to an input by the customer, a first interface on a web-enabled customer device associated with the customer that comprises a prompt for initiating a process by which the customer provides one or more images of the target object; receiving the one or more images of the target object as provided by the customer; processing the one or more images, wherein the processing includes: identifying a base object corresponding to the target object; querying a product database based on the identified base object and retrieving therefrom data related to the base object, the retrieved data including a base object model of the base object, product identification information, and customer service information associated with the base object; and analyzing the one or more images using a base object model of the base object by comparing the one or more images of the target object to the base object model to detect a set of changes; based on the detected set of changes, determining a problem statement related to the interaction; based on the customer service information and the detected set of changes, selecting an applicable contact center as the contact center for the interaction and a resource within the contact center corresponding to the problem statement; generating a second interface on the customer device that comprises a confirmation prompt requesting confirmation from the customer as to a correctness of the problem statement; in response to receiving an input from the customer indicating confirmation, transmitting a communication to the contact center related to initiating the interaction, wherein the communication comprises the problem statement.

BRIEF DESCRIPTION OF THE DRAWINGS

A more complete appreciation of the present invention will become more readily apparent as the invention becomes better understood by reference to the following detailed description when considered in conjunction with the accompanying drawings, in which like reference symbols indicate like components. The drawings include the following figures.

DETAILED DESCRIPTION

Figure 1:
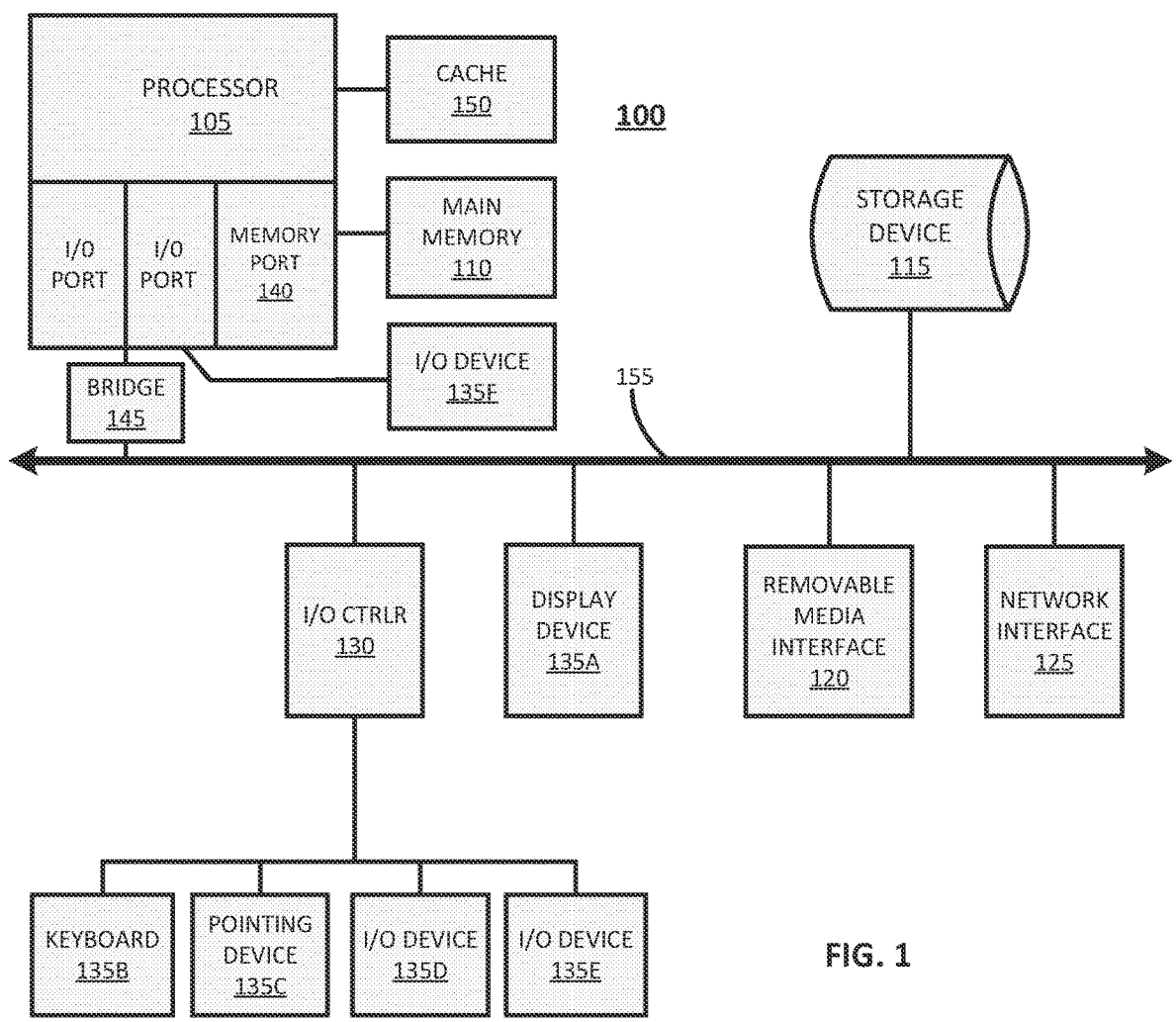
FIG. 1 depicts a schematic block diagram of a computing device in accordance with exemplary embodiments of the present invention and/or with which exemplary embodiments of the present invention may be enabled or practiced.

For the purposes of promoting an understanding of the principles of the invention, reference will now be made to the exemplary embodiments illustrated in the drawings and specific language will be used to describe the same. It will be apparent, however, to one having ordinary skill in the art that the detailed material provided in the examples may not be needed to practice the present invention. In other instances, well-known materials or methods have not been described in detail in order to avoid obscuring the present invention. As used herein, language designating nonlimiting examples and illustrations includes "e.g.", "i.e.", "for example", "for instance" and the like. Further, reference throughout this specification to "an embodiment", "one embodiment", "present embodiments", "exemplary embodiments", "certain embodiments" and the like means that a particular feature, structure or characteristic described in connection with the given example may be included in at least one embodiment of the present invention. Particular features, structures or characteristics may be combined in any suitable combinations and/or sub-combinations in one or more embodiments or examples. Those skilled in the art will recognize from the present disclosure that the various embodiments may be computer implemented using many different types of data processing equipment, with embodiments being implemented as an apparatus, method, or computer program product.

The flowcharts and block diagrams provided in the figures illustrate architecture, functionality, and operation of possible implementations of systems, methods, and computer program products in accordance with example embodiments of the present invention. In this regard, it will be understood that each block of the flowcharts and/or block diagrams—or combinations of those blocks—may represent a module, segment, or portion of program code having one or more executable instructions for implementing the specified logical functions. It will similarly be understood that each of block of the flowcharts and/or block diagrams—or combinations of those blocks—may be implemented by special purpose hardware-based systems or combinations of special purpose hardware and computer instructions performing the specified acts or functions. Such computer program instructions also may be stored in a computer-readable medium that can direct a computer or other programmable data processing apparatus to function in a particular manner, such that the program instructions in the computer-readable medium produces an article of manufacture that includes instructions by which the functions or acts specified in each block of the flowcharts and/or block diagrams—or combinations of those blocks—are implemented.

Computing Device

The systems and methods of the present invention may be computer implemented using many different forms of data processing equipment, for example, digital microprocessors and associated memory, executing appropriate software programs. By way of background, FIG. 1 illustrates a schematic block diagram of an exemplary computing device 100 in accordance with embodiments of the present invention and/or with which those embodiments may be enabled or practiced. It should be understood that FIG. 1 is provided as a non-limiting example.

The computing device 100, for example, may be implemented via firmware (e.g., an application-specific integrated circuit), hardware, or a combination of software, firmware, and hardware. It will be appreciated that each of the servers, controllers, switches, gateways, engines, and/or modules in the following figures (which collectively may be referred to as servers or modules) may be implemented via one or more of the computing devices 100. As an example, the various servers may be a process running on one or more processors of one or more computing devices 100, which may be executing computer program instructions and interacting with other systems or modules in order to perform the various functionalities described herein. Unless otherwise specifically limited, the functionality described in relation to a plurality of computing devices may be integrated into a single computing device, or the various functionalities described in relation to a single computing device may be distributed across several computing devices. Further, in relation to any of the computing systems described herein, the various servers and computer devices may be located on computing devices 100 that are local (i.e., on-site) or remote (i.e., off-site or in a cloud computing environment), or some combination thereof.

As shown in the illustrated example, the computing device 100 may include a central processing unit (CPU) or processor 105 and a main memory 110. The computing device 100 may also include a storage device 115, removable media interface 120, network interface 125, I/O controller 130, and one or more input/output (I/O) devices 135, which as depicted may include an, display device 135A, keyboard 135B, and pointing device 135C. The computing device 100 further may include additional elements, such as a memory port 140, a bridge 145, I/O ports, one or more additional input/output devices 135D, 135E, 135F, and a cache memory 150 in communication with the processor 105.

The processor 105 may be any logic circuitry that responds to and processes instructions fetched from the main memory 110. For example, the process 105 may be implemented by an integrated circuit, e.g., a microprocessor, microcontroller, or graphics processing unit, or in a field-programmable gate array or application-specific integrated circuit. As depicted, the processor 105 may communicate directly with the cache memory 150 via a secondary bus or backside bus. The main memory 110 may be one or more memory chips capable of storing data and allowing stored data to be directly accessed by the central processing unit 105. The storage device 115 may provide storage for an operating system. Unless otherwise limited, the computing device 100 may include an operating system and software capable of performing the functionality described herein.

As depicted in the illustrated example, the computing device 100 may include a wide variety of I/O devices 135, one or more of which may be connected via the I/O controller 130. Input devices, for example, may include a keyboard 135B and a pointing device 135C, e.g., a mouse or optical pen. Output devices, for example, may include video display devices, speakers, and printers. The computing device 100 may also support one or more removable media interfaces 120. More generally, the I/O devices 135 may include any conventional devices for performing the functionality described herein.

Unless otherwise restricted, the computing device 100 may be any workstation, desktop computer, laptop or notebook computer, server machine, virtualized machine, mobile or smartphone, portable telecommunication device, or any other type of computing device, without limitation, capable of performing the functionality described herein. The computing device 100 may include a plurality of devices and resources connected by a network. As used herein, a network includes one or more computing devices, machines, clients, client nodes, client machines, client computers, endpoints, or endpoint nodes in communication with one or more other such devices. The network may be a private or public switched telephone network (PSTN), wireless carrier network, local area network (LAN), private wide area network (WAN), public WAN such as the Internet, etc., with connections being established using communication protocols. More generally, it should be understood that, unless otherwise limited, the computing device 100 may communicate with other computing devices 100 via any type of network using any communication protocol. Further, the network may be a virtual network environment where various network components are virtualized. Other types of virtualization are also contemplated.

Contact Center

Figure 2:
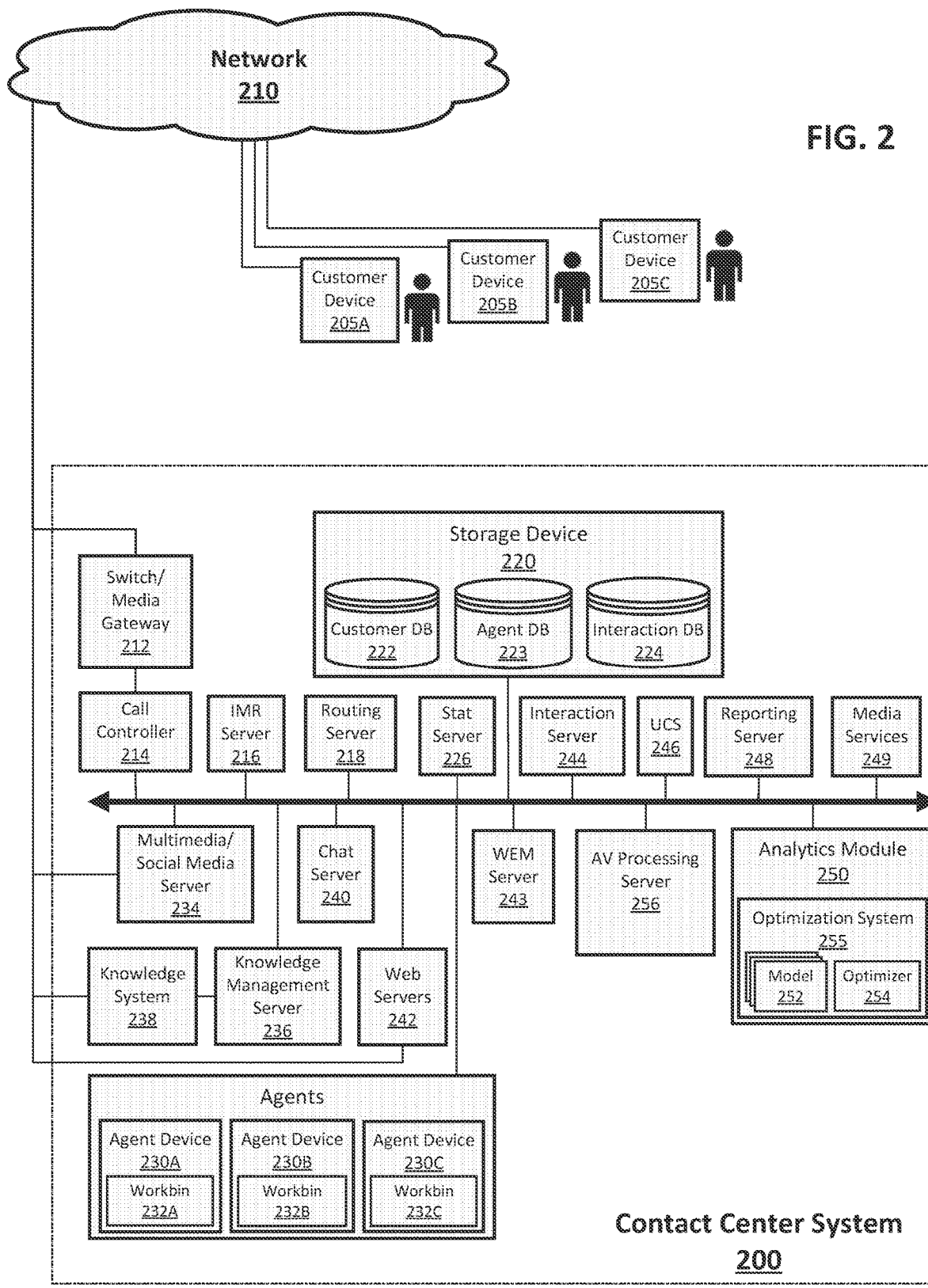
FIG. 2 depicts a schematic block diagram of a communications infrastructure or contact center in accordance with exemplary embodiments of the present invention and/or with which exemplary embodiments of the present invention may be enabled or practiced.

With reference now to FIG. 2, a communications infrastructure or contact center system 200 is shown in accordance with exemplary embodiments of the present invention and/or with which exemplary embodiments of the present invention may be enabled or practiced. It should be understood that the term "contact center system" is used herein to refer to the system depicted in FIG. 2 and/or the components thereof, while the term "contact center" is used more generally to refer to contact center systems, customer service providers operating those systems, and/or the organizations or enterprises associated therewith. Thus, unless otherwise specifically limited, the term "contact center" refers generally to a contact center system (such as the contact center system 200), the associated customer service provider (such as a particular customer service provider providing customer services through the contact center system 200), and/or the organization or enterprise on behalf of which those customer services are being provided.

By way of background, customer service providers generally offer many types of services through contact centers. Such contact centers may be staffed with employees or customer service agents (or simply "agents"), with the agents serving as an interface between a company, enterprise, government agency, or organization (hereinafter referred to interchangeably as an "organization" or "enterprise") and persons, such as users, individuals, or customers (hereinafter referred to interchangeably as "user", "individuals" or "customers"). For example, the agents at a contact center may receive customer orders, solve customer problems with products or services already received, or assist customers in making purchasing decisions. Within a contact center, such interactions between contact center agents and outside entities or customers may be conducted over a variety of communication channels, such as, for example, via voice (e.g., telephone calls or voice over IP or VoIP calls), video (e.g., video conferencing), text (e.g., emails and text chat), screen sharing, co-browsing, or the like.

Referring specifically to FIG. 2, contact centers generally strive to provide quality services to customers while minimizing costs. Contact centers may include many different systems and modules—such as those shown in exemplary contact center system 200—in furtherance of this aim. The contact center system 200 may be used to engage and manage interactions in which automated processes (or bots) or human agents communicate with customers. As should be understood, the contact center system 200 may be an in-house facility to a business or enterprise for performing the functions of sales and customer service relative to its. In another aspect, the contact center system 200 may be operated by a third-party service provider that contracts to provide services for another organization. Further, the contact center system 200 may be deployed on equipment dedicated to the enterprise or third-party service provider, and/or deployed in a remote computing environment such as, for example, a private or public cloud environment. The contact center system 200 may include software applications or programs executed on premises and/or remotely. The various components of the contact center system 200, thus, may be distributed across various geographic locations and/or housed locally.

Unless otherwise specifically limited, any of the computing elements of the present invention may be implemented in cloud-based or cloud computing environments. As used herein, "cloud computing"—or, simply, the "cloud"—is defined as a model for enabling ubiquitous, convenient, on-demand network access to a shared pool of configurable computing resources (e.g., networks, servers, storage, applications, and services) that can be rapidly provisioned via virtualization and released with minimal management effort or service provider interaction, and then scaled accordingly. Cloud computing can be composed of various characteristics (e.g., on-demand self-service, broad network access, resource pooling, rapid elasticity, measured service, etc.), service models (e.g., Software as a Service ("SaaS"), Platform as a Service ("PaaS"), Infrastructure as a Service ("IaaS"), and deployment models (e.g., private cloud, community cloud, public cloud, hybrid cloud, etc.). Often referred to as a "serverless architecture", a cloud execution model generally includes a service provider dynamically managing an allocation and provisioning of remote servers for achieving a desired functionality.

In accordance with FIG. 2, the components or modules of the contact center system 200 may include: a plurality of customer devices 205A, 205B, 205C; communications network (or simply "network") 210; switch/media gateway 212; call controller 214; interactive media response (IMR) server 216; routing server 218; storage device 220; statistics (or "stat") server 226; plurality of agent devices 230A, 230B, 230C that include workbins 232A, 232B, 232C, respectively; multimedia/social media server 234; knowledge management server 236 coupled to a knowledge system 238; chat server 240; web servers 242; workforce engagement management ("WEM") server 243; interaction server 244; universal contact server (or "UCS") 246; reporting server 248; media services server 249; an analytics module 250; and an audiovisual processing server 256. Any of the computer-implemented components, modules, or servers described in relation to FIG. 2 or in any of the following figures may be implemented via any type of computing devices, including the example computing device 100 of FIG. 1. As will be seen, the contact center system 200 generally manages resources (e.g., personnel, computers, telecommunication equipment, etc.) to enable delivery of services via telephone, email, chat, or other communication mechanisms. Such services may vary depending on the type of contact center and, for example, may include customer service, help desk functionality, emergency response, telemarketing, order taking, and the like.

Customers desiring to receive services from the contact center system 200 may initiate inbound communications (e.g., telephone calls, emails, chats, etc.) to the contact center system 200 via a customer device 205. While FIG. 2 shows three such customer devices—i.e., customer devices 205A, 205B, and 205C—any number may be present. The customer devices 205, for example, may be a communication device, such as a telephone, smartphone, computer, tablet, or laptop. In accordance with functionality described herein, customers may generally use the customer devices 205 to initiate, manage, and conduct communications with the contact center system 200, such as telephone calls, emails, chats, text messages, and the like.

Inbound and outbound communications from and to the customer devices 205 may traverse the network 210, with the nature of network typically depending on the type of customer device being used and form of communication. As an example, the network 210 may include a communication network of telephone, cellular, and/or data services. The network 210 may be a private or public switched telephone network (PSTN), local area network (LAN), private wide area network (WAN), and/or public WAN such as the Internet. Further, the network 210 may include any wireless carrier network.

In regard to the switch/media gateway 212, it may be coupled to the network 210 for receiving and transmitting telephone calls between customers and the contact center system 200. The switch/media gateway 212 may include a telephone or communication switch configured to function as a central switch for agent level routing within the center. The switch may be a hardware switching system or implemented via software. For example, the switch 215 may include an automatic call distributor, a private branch exchange (PBX), an IP-based software switch, and/or any other switch with specialized hardware and software configured to receive Internet-sourced interactions and/or telephone network-sourced interactions from a customer, and route those interactions to, for example, one of the agent devices 230. Thus, in general, the switch/media gateway 212 establishes a voice connection between the customer and the agent by establishing a connection between the customer device 205 and agent device 230. As further shown, the switch/media gateway 212 may be coupled to the call controller 214 which, for example, serves as an adapter or interface between the switch and the other routing, monitoring, and communication-handling components of the contact center system 200. The call controller 214 may be configured to process PSTN calls, VoIP calls, etc. For example, the call controller 214 may include computer-telephone integration (CTI) software for interfacing with the switch/media gateway and other components. The call controller 214 may include a session initiation protocol (SIP) server for processing SIP calls. The call controller 214 may also extract data about an incoming interaction, such as the customer's telephone number, IP address, or email address, and then communicate these with other contact center components in processing the interaction.

In regard to the interactive media response (IMR) server 216, it may be configured to enable self-help or virtual assistant functionality. Specifically, the IMR server 216 may be similar to an interactive voice response (IVR) server, except that the IMR server 216 is not restricted to voice and may also cover a variety of media channels. In an example illustrating voice, the IMR server 216 may be configured with an IMR script for querying customers on their needs. For example, a contact center for a bank may tell customers via the IMR script to "press 1" if they wish to retrieve their account balance. Through continued interaction with the IMR server 216, customers may receive service without needing to speak with an agent. The IMR server 216 may also be configured to ascertain why a customer is contacting the contact center so that the communication may be routed to the appropriate resource.

In regard to the router or routing server 218, it may function to route incoming interactions. The routing server 218 may perform predictive routing whereby incoming interactions are routed to resources calculated to deliver the best result for the customer and/or contact center. For example, functionality within the routing server 218 may select the most appropriate agent and route the communication thereto. The agent selection may be based on which available agent is best suited for handling the communication. More specifically, the selection of appropriate agent may be based on a routing strategy or algorithm that is implemented by the routing server 218. In doing this, the routing server 218 may query data that is relevant to the incoming interaction, for example, data relating to the particular customer, available agents, and the type of interaction, which, as described more below, may be stored in particular databases. Once the agent is selected, the routing server 218 may interact with the call controller 214 to route (i.e., connect) the incoming interaction to the corresponding agent device 230. As part of this connection, information about the customer may be provided to the selected agent via their agent device 230. This information is intended to enhance the service the agent provides to the customer.

Regarding data storage, the contact center system 200 may include one or more mass storage devices—represented generally by the storage device 220—for storing data relevant to the functioning of the contact center. For example, the storage device 220 may store customer data that is maintained in a customer database 222. Such customer data may include customer profiles, contact information, service level agreement (SLA), and interaction history (e.g., details of previous interactions with a particular customer, including the nature of previous interactions, disposition data, wait time, handle time, and actions taken by the contact center to resolve customer issues). As another example, the storage device 220 may store agent data in an agent database 223. Agent data maintained by the contact center system 200 may include agent availability and agent profiles, schedules, skills, handle time, etc. As another example, the storage device 220 may store interaction data in an interaction database 224. Interaction data may include data relating to numerous past interactions between customers and contact centers. More generally, it should be understood that, unless otherwise specified, the storage device 220 may be configured to include databases and/or store data related to any of the types of information described herein, with those databases and/or data being accessible to the other modules or servers of the contact center system 200 in ways that facilitate the functionality described herein. For example, the servers or modules of the contact center system 200 may query such databases to retrieve data stored therewithin or transmit data thereto for storage. The storage device 220, for example, may take the form of any conventional storage medium and may be locally housed or operated from a remote location.

In regard to the stat server 226, it may be configured to record and aggregate data relating to the performance and operational aspects of the contact center system 200. Such information may be compiled by the stat server 226 and made available to other servers and modules, such as the reporting server 248, which then may use the data to produce reports that are used to manage operational aspects of the contact center and execute automated actions in accordance with functionality described herein. Such data may relate to the state of contact center resources, e.g., average wait time, abandonment rate, agent occupancy, and others, as functionality described herein would require.

The agent devices 230 of the contact center 200 may be communication devices configured to interact with the various components and modules of the contact center system 200 in ways that facilitate functionality described herein. An agent device 230 may further include a computing device configured to communicate with the servers of the contact center system 200, perform data processing associated with operations, and interface with customers via voice, chat, email, and other multimedia communication mechanisms according to functionality described herein. While FIG. 2 shows three such agent devices 230, any number may be present.

In regard to the multimedia/social media server 234, it may be configured to facilitate media interactions (other than voice) with the customer devices 205 and/or the web servers 242. Such media interactions may be related, for example, to email, voice mail, chat, video, text-messaging, web, social media, co-browsing, etc. The multi-media/social media server 234 may take the form of any IP router conventional in the art with specialized hardware and software for receiving, processing, and forwarding multi-media events and communications.

In regard to the knowledge management server 234, it may be configured to facilitate interactions between customers and the knowledge system 238. In general, the knowledge system 238 may be a computer system capable of receiving questions or queries and providing answers in response. The knowledge system 238 may be included as part of the contact center system 200 or operated remotely by a third party. The knowledge system 238 may include an artificially intelligent computer system capable of answering questions posed in natural language by retrieving information from information sources such as encyclopedias, dictionaries, newswire articles, literary works, or other documents submitted to the knowledge system 238 as reference materials, as is known in the art.

In regard to the chat server 240, it may be configured to conduct, orchestrate, and manage electronic chat communications with customers. In general, the chat server 240 is configured to implement and maintain chat conversations and generate chat transcripts. Such chat communications may be conducted by the chat server 240 in such a way that a customer communicates with automated chatbots, human agents, or both. In exemplary embodiments, the chat server 240 may perform as a chat orchestration server that dispatches chat conversations among the chatbots and available human agents. In such cases, the processing logic of the chat server 240 may be rules driven so to leverage an intelligent workload distribution among available chat resources. The chat server 240 further may implement, manage and facilitate user interfaces (also UIs) associated with the chat feature, including those UIs generated at either the customer device 205 or the agent device 230. The chat server 240 may be configured to transfer chats within a single chat session with a particular customer between automated and human sources such that, for example, a chat session transfers from a chatbot to a human agent or from a human agent to a chatbot. The chat server 240 may also be coupled to the knowledge management server 234 and the knowledge systems 238 for receiving suggestions and answers to queries posed by customers during a chat so that, for example, links to relevant articles can be provided.

In regard to the web servers 242, such servers may be included to provide site hosts for a variety of social interaction sites to which customers subscribe, such as Facebook, Twitter, Instagram, etc. Though depicted as part of the contact center system 200, it should be understood that the web servers 242 may be provided by third parties and/or maintained remotely. The web servers 242 may also provide webpages for the enterprise or organization being supported by the contact center system 200. For example, customers may browse the webpages and receive information about the products and services of a particular enterprise. Within such enterprise webpages, mechanisms may be provided for initiating an interaction with the contact center system 200, for example, via web chat, voice, or email. An example of such a mechanism is a widget, which can be deployed on the webpages or websites hosted on the web servers 242. As used herein, a widget refers to a user interface component that performs a particular function. In some implementations, a widget may include a graphical user interface control that can be overlaid on a webpage displayed to a customer via the Internet. The widget may show information, such as in a window or text box, or include buttons or other controls that allow the customer to access certain functionalities, such as sharing or opening a file or initiating a communication. In some implementations, a widget includes a user interface component having a portable portion of code that can be installed and executed within a separate webpage without compilation. Some widgets can include corresponding or additional user interfaces and be configured to access a variety of local resources (e.g., a calendar or contact information on the customer device) or remote resources via network (e.g., instant messaging, electronic mail, or social networking updates).

In regard to the WEM server 243, it may be configured to host and enable a suite of features focused on improving employee engagement in contact centers, which may be referred to broadly as "workforce engagement management" (or "WEM"). The WEM server 243 may provide solutions that simplify the agent experience and help drive results and employee satisfaction. The WEM server 243 may include capabilities such as call recording, screen recording, quality management, performance management, speech and text analytics, gamification, as well as capabilities related to workforce management (or "WFM") and workforce optimization ("WFO"). In general, WFM makes sure that the right resource is there at the right time for service, while WFO provides the ability to monitor and act upon the content of the interactions via quality management and interaction analytics. In addition to those functions, WEM further ensures that the prerequisites for enabling contact center to provide effective customer service over the long-term by engaging the agents who provide the service. In doing this, the WEM server 243 may provide functionality aimed at allowing contact centers to improve metrics related to employee recognition, churn, and development. Further, WEM recognizes a shift within the contact center industry from focusing on optimizing labor productivity and managing labor costs—i.e., workforce optimization—to a more employee-centric focus that engages agents throughout the employment life cycle. WEM applications are designed to increase agent engagement by automating tasks associated with scheduling, coaching, quality management, performance management and more. More specifically, the WEM server 243 may include core applications such as recording interactions across all channels, quality monitoring with automated scoring, workforce management with AI-infused scheduling and forecasting, performance management, speech and data analytics, and others. The WEM server 243 may further provide features such as gamification, robotic process automation, voice authentication, predictive analytics, chatbots, customer engagement hub, tools for building custom applications, and AI and analytics. For example, AI-infused algorithms can prepare more accurate agent schedules, customer insights, routing, etc., which consider more variables and have greater predictive power. Further, much of the tedious labor involved in quality monitoring can be automated, which saves time and money and improves agent morale. Other functionality may include any of the related features described herein as would be understood and enabled by one of ordinary skill in the art. Such enablement may include connections with any of the other servers, devices and data sources described herein.

In regard to the interaction server 244, it may be configured to manage deferrable activities of the contact center and the routing thereof to human agents for completion. As used herein, deferrable activities include back-office work that can be performed off-line, e.g., responding to emails, attending training, and other activities that do not entail real-time communication with a customer. As an example, the interaction server 244 may be configured to interact with the routing server 218 for selecting an appropriate agent to handle each of the deferable activities. Once assigned to a particular agent, the deferable activity is pushed to that agent so that it appears on the agent device 230 of the selected agent. The deferable activity may appear in a workbin 232 as a task for the selected agent to complete. The functionality of the workbin 232 may be implemented via any conventional data structure, such as, for example, a linked list, array, etc. Each of the agent devices 230 may include a workbin 232, with the workbins 232A, 232B, and 232C being maintained in the agent devices 230A, 230B, and 230C, respectively. As an example, a workbin 232 may be maintained in the buffer memory of the corresponding agent device 230.

In regard to the universal contact server (UCS) 246, it may be configured to retrieve information stored in the customer database 222 and/or transmit information thereto for storage therein. For example, the UCS 246 may be utilized as part of the chat feature to facilitate maintaining a history on how chats with a particular customer were handled, which then may be used as a reference for how future chats should be handled. More generally, the UCS 246 may be configured to facilitate maintaining a history of customer preferences, such as preferred media channels and best times to contact. To do this, the UCS 246 may be configured to identify data pertinent to the interaction history for each customer such as, for example, data related to comments from agents, customer communication history, and the like. Each of these data types then may be stored in the customer database 222 or on other modules and retrieved as functionality described herein requires.

In regard to the reporting server 248, it may be configured to generate reports from data compiled and aggregated by the statistics server 226 or other sources. Such reports may include near real-time reports or historical reports and concern the state of contact center resources and performance characteristics, such as, for example, average wait time, abandonment rate, agent occupancy. The reports may be generated automatically or in response to specific requests from a requestor (e.g., agent, administrator, contact center application, etc.). The reports then may be used toward managing the contact center operations in accordance with functionality described herein.

In regard to the media services server 249, it may be configured to provide audio and/or video services to support contact center features. In accordance with functionality described herein, such features may include prompts for an IVR or IMR system (e.g., playback of audio files), hold music, voicemails/single party recordings, multi-party recordings (e.g., of audio and/or video calls), speech recognition, dual tone multi frequency (DTMF) recognition, faxes, audio and video transcoding, secure real-time transport protocol (SRTP), audio conferencing, video conferencing, coaching (e.g., support for a coach to listen in on an interaction between a customer and an agent and for the coach to provide comments to the agent without the customer hearing the comments), call analysis, keyword spotting, and the like.

In regard to the analytics module 250, it may be configured to provide systems and methods for performing analytics on data received from a plurality of different data sources as functionality described herein may require. In accordance with example embodiments, the analytics module 250 also may generate, update, train, and modify predictors or models 252 based on collected data, such as, for example, customer data, agent data, and interaction data. The models 252 may include behavior models of customers or agents. The behavior models may be used to predict behaviors of, for example, customers or agents, in a variety of situations, thereby allowing embodiments of the present invention to tailor interactions based on such predictions or to allocate resources in preparation for predicted characteristics of future interactions, thereby improving overall contact center performance and the customer experience. It will be appreciated that, while the analytics module 250 is depicted as being part of a contact center, such behavior models also may be implemented on customer systems (or, as also used herein, on the "customer-side" of the interaction) and used for the benefit of customers.

According to exemplary embodiments, the analytics module 250 may have access to the data stored in the storage device 220, including the customer database 222 and agent database 223. The analytics module 250 also may have access to the interaction database 224, which stores data related to interactions and interaction content (e.g., transcripts of the interactions and events detected therein), interaction metadata (e.g., customer identifier, agent identifier, medium of interaction, length of interaction, interaction start and end time, department, tagged categories), and the application setting (e.g., the interaction path through the contact center). Further, as discussed more below, the analytic module 250 may be configured to retrieve data stored within the storage device 220 for use in developing and training algorithms and models 252, for example, by applying machine learning techniques.

One or more of the included models 252 may be configured to predict customer or agent behavior and/or aspects related to contact center operation and performance. Further, one or more of the models 252 may be used in natural language processing and, for example, include intent recognition and the like. The models 252 may be developed based upon 1) known first principle equations describing a system, 2) data, resulting in an empirical model, or 3) a combination of known first principle equations and data. In developing a model for use with present embodiments, because first principles equations are often not available or easily derived, it may be generally preferred to build an empirical model based upon collected and stored data. To properly capture the relationship between the manipulated/disturbance variables and the controlled variables of complex systems, it may be preferable that the models 252 are nonlinear. This is because nonlinear models can represent curved rather than straight-line relationships between manipulated/disturbance variables and controlled variables, which are common to complex systems such as those discussed herein. Given the foregoing requirements, a machine learning or neural network or deep learning approach is presently a preferred embodiment for implementing the models 252. Neural networks, for example, may be developed based upon empirical data using advanced regression algorithms.

The analytics module 250 may further include an optimizer 254. As will be appreciated, an optimizer may be used to minimize a "cost function" subject to a set of constraints, where the cost function is a mathematical representation of desired objectives or system operation. Because the models 252 may be non-linear, the optimizer 254 may be a nonlinear programming optimizer. It is contemplated, however, that the present invention may be implemented by using, individually or in combination, a variety of different types of optimization approaches, including, but not limited to, linear programming, quadratic programming, mixed integer nonlinear programming, stochastic programming, global nonlinear programming, genetic algorithms, particle/swarm techniques, and the like.

According to exemplary embodiments, the models 252 and the optimizer 254 may together be used within an optimization system 255. For example, the analytics module 250 may utilize the optimization system 255 as part of an optimization process by which aspects of contact center performance and operation are optimized or, at least, enhanced. This, for example, may include aspects related to the customer experience, agent experience, interaction routing, natural language processing, intent recognition, or other functionality related to automated processes.

In regard to the audiovisual processing server 256, this component is configured to provide functionality related to audiovisual processing. As will be seen, the audiovisual processing server 256 may be comprised of two systems: a video processing system and a speech recognition system. As discussed in more detail below, the audiovisual processing server 256 may further orchestrate other components, servers, and modules of a contact center and the data related thereto, such as those components, servers, and modules described above in relation to the example contact center system 200, so to provide the functionality described herein, as would be understood by one of ordinary skill in the art. In certain embodiments, the audiovisual processing server 256 may be augmented with an image processing system 1000, as described more below.

The various components, modules, and/or servers of FIG. 2—as well as those of the other figures included herein—may each include one or more processors executing computer program instructions and interacting with other system components for performing the various functionalities described herein. Such computer program instructions may be stored in a memory implemented using a standard memory device. Although the functionality of each of the servers is described as being provided by the particular server, it should be recognized that the functionality of various servers may be combined or integrated into a single server, or the functionality of a particular server may be distributed across one or more other servers. Further, the terms "interaction" and "communication" are used interchangeably, and generally refer to any real-time and non-real-time interaction that uses any communication channel of the contact center. Access to and control of the components of the contact system 200 may be affected through user interfaces (UIs) that may be generated on the customer devices 205 and/or the agent devices 230.

Figure 3:
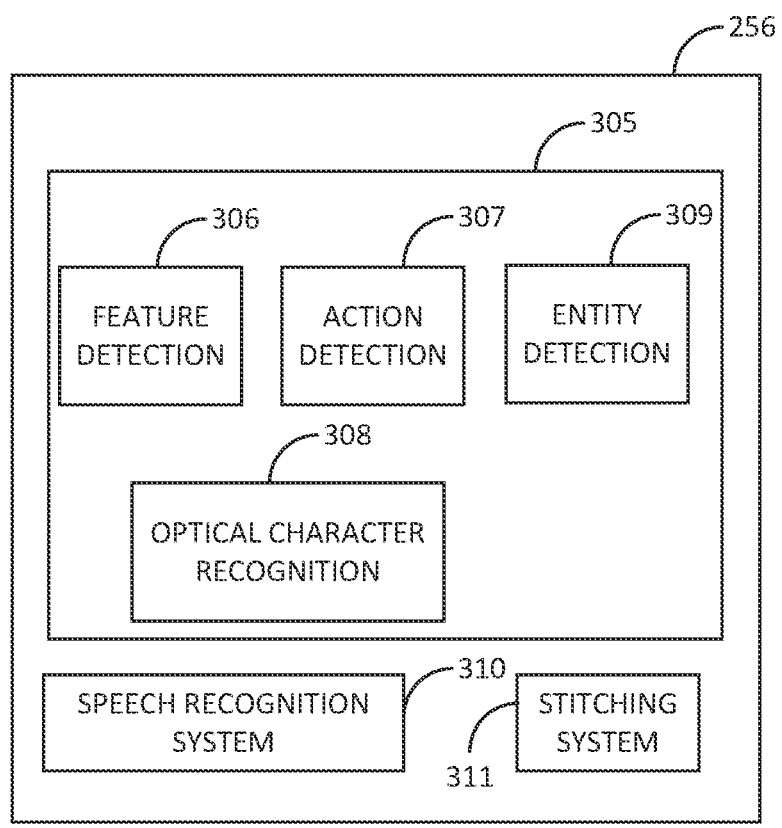
FIG. 3 is a diagram illustrating an embodiment of an audiovisual processing server.

FIG. 3 is a diagram illustrating an embodiment of a block diagram of an audiovisual processing server 256. The audiovisual processing server 256 may be part of the contact center 200 and may further be comprised of two systems: a video processing system 305 and a speech recognition system 310. The video processing system 305 may also be comprised of: a feature detection application 306, an action detection application 307, an optical character recognition (OCR) application 308, and an entity detection application 309. In an embodiment, the feature detection application 306, action detection application 307, OCR application 308, and entity detection application 309 may be realized as services accessible by the video processing system 305 or as separate systems working in concert with the video processing system 305.

In an embodiment, the feature detection application 306 may be used to divide an incoming video file into individual video frames, groupings of individual video frames, or shorter video clips. The feature detection application 306 may use Scale-invariant feature transformation (SIFT) to perform feature detection. SIFT may be deployed to take video as input and splits it into frames. The number of frames that the video is split into can be predetermined based on a set number of frames per minute of video. It begins to perform image processing using SIFT methodology that perform local feature extraction from these frames. Each frame is processed and compared with the frames before and after it. Where there is movement, the frames change constantly, and the methodology recognizes that there is a continuous action being performed. When there is a pause between the actions, the frames remain identical, and the methodology splits the video into a number of video clips. This may be performed repeatedly in a loop to split the video into required number of video clips based on actions performed. After dividing the video into a number of video clips, the last frame of each video clip may be utilized to perform additional analysis on each video clip using action detection application 307 and optical character recognition (OCR) application 308. An entity detection application 309 may be used to detect an interacted entity during the generated audiovisual clip. An entity might comprise a web browser object in a web browser window. The stitching system 311 may be used to identify the audio portion which is relevant to the video action and then stitch them together.

In an embodiment, the action detection application 307 may be configured to detect and recognize actions depicted in an incoming video file. The action detection application 307 may deploy an appropriate methodology (e.g., a convolutional neural network) to classify frames in a video, such as to determine an action being taken on a particular object in the frame of the video. For example, if a circle is drawn in the video of the incoming video file, then the action detection application 307 may be configured to detect that an action has occurred during the time period of the circle being drawn. The action detection application 307 may also be configured to identify any objects on screen that are associated with the particular circle being drawn.

In an embodiment, the OCR application 308 may be configured to detect and recognize text typed during the incoming video file to determine text written over frames in the incoming video file. The OCR application 308 may deploy an appropriate methodology to classify text in a video. For example, STN-OCR, a single semi-supervised Deep Neural Network (DNN), consisting of a spatial transformer network (which may be used to detect text regions in frames) and a text recognition network (which recognizes the textual content of the identified text regions) may be deployed in OCR application 308. The OCR application 308 may provide text information synchronized with certain actions detected by the action detection application 307.

The speech recognition system 310 may be configured to detect and recognize speech patterns and transcribe the spoken words into written text. The speech recognition system 310 may deploy an appropriate methodology to recognize spoken words in an audio file. For example, Natural Language Processing (NLP) and Supervised Machine Learning (ML) may be deployed in the speech recognition system 310. The speech recognition system 310 may also generate text information synchronized with certain actions detected by the action detection application 307.

Figure 4A:
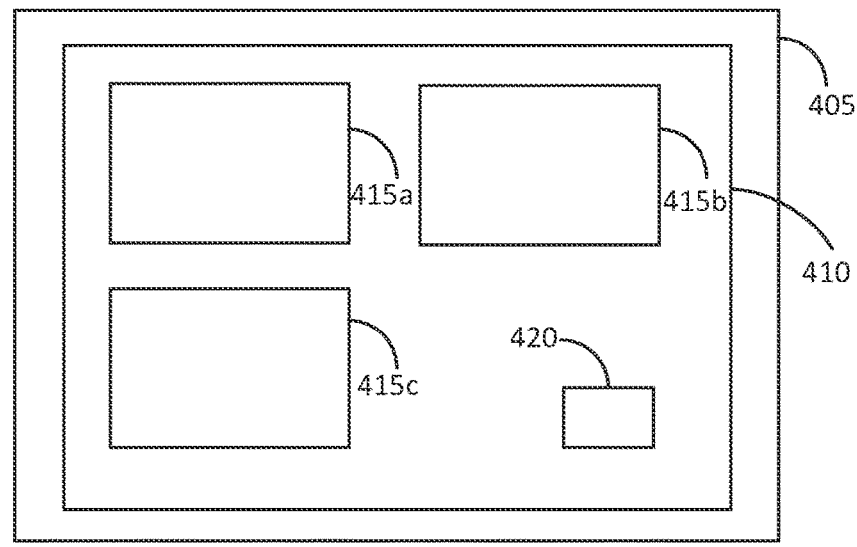
FIG. 4A is a diagram illustrating an embodiment of a web-connected customer device displaying a web browser window.

FIG. 4A is a diagram illustrating an embodiment of a web-connected customer device displaying a web browser window, indicated generally. The web-connected customer device 405 may be a personal computer, a mobile device, tablet, smart television, gaming console, or other device that can, for example, render HTML code to generate textual and graphical web pages on a computing device. The web-connected customer device 405 may contain a screen or monitor for viewing rendered web pages. The web-connected customer device 405 may display a web browser window 410. The web browser window 410 may be generated through a web- or Internet-browser application or program (e.g., Internet Explorer or Google's Chrome) on the web-connected customer device 405.

Web browser objects 415a, 415b, 415c (collectively 415) are elements seen in the web browser window 410. A web browser object 415 may include content rendered in the web browser window 410 by the web- or Internet-browser application or program on the web-connected customer device 405. Content shown as a web browser object 415 may include, but not be limited to, text, graphics, tables, hyperlinks, and embedded objects. While only three web browser objects 415 are illustrated for simplicity, the web browser window 410 may contain any number of web browser objects 415.

Figure 4B:
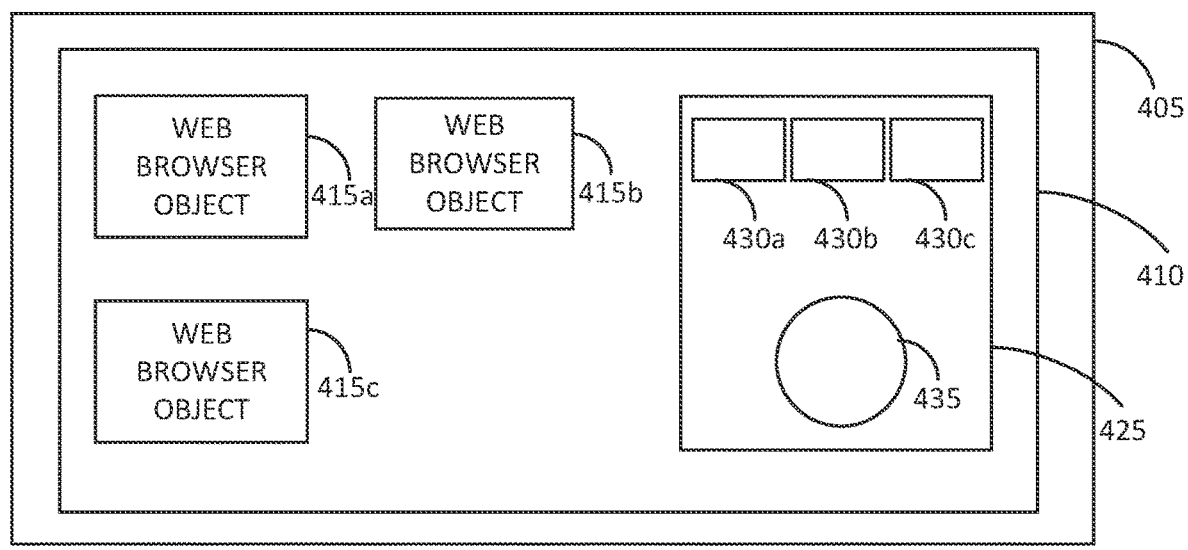
FIG. 4B is a diagram illustrating an embodiment of a web-connected customer device displaying a web browser window.

A web browser window 410 may also contain an editable audiovisual interface engagement object 420, which may be used to engage an editable audiovisual interface 425 that assists in capturing queries to be handled by the contact center (described in greater detail in FIG. 4B). The editable audiovisual interface engagement object 420 may be depicted as a button or clickable image shown in web browser window 410. The position of the object 420 may be located in any reasonable position in the window 410. In FIG. 4A, it is generally depicted in the lower right corner, for example.

The editable audiovisual interface engagement object 420 may be provided through a platform or service from a source different than the source of the content of the web browser window 410 (e.g., Genesys Web Engagement by Genesys Telecommunications Laboratories, Inc.). For example, a business enterprise, such as an online marketplace, may have a website shown in web browser window 410 containing a webpage of showing a particular product for sale by the business enterprise. In an embodiment, a contact center may provide the editable audiovisual interface engagement object 420 as an overlay in the web browser window 410 through a web server 242 that is not controlled by the business enterprise. However, it may appear to a user of the web browser window 410 as a single, integrated web page.

FIG. 4B is a diagram illustrating an embodiment of a web-connected customer device displaying a web browser window, indicating generally. The embodiment described in FIG. 4B may further comprise an editable audiovisual interface for the web browser window. The editable audiovisual interface 425 may be displayed in a plurality of ways. In an embodiment, the interface 425 may be displayed as a separate window within the web browser of the customer device 405. In another embodiment, it may be displayed as an overlaid window on top of the web browser window 410. In another embodiment, it may be displayed as a separate application that may interact with web browser window 410.

The editable audiovisual interface 425 may be displayed on the web browser window 410 after the customer engages with the editable audiovisual interface engagement object 420. The editable audiovisual interface 425 may also be displayed on the web browser window 410 after the customer is provided a link from a communication (such as an email or SMS text message) to engage the editable audiovisual interface 425. The editable audiovisual interface 425 may also be displayed on the web browser window 410 as directed by a remote system, such as a contact center, whereby an agent of the contact center may direct the engagement of the editable audiovisual interface 425.

In an embodiment, the editable audiovisual interface 425 may be configured to generate a multimedia enabled and enriched video mail to be sent to the contact center. The editable audiovisual interface 425 may permit a customer to create an enriched video within the web browser window 410 incorporating web browser objects 415 into the enriched video. Creating an enriched video within the web browser window 410 permits the user of the editable audiovisual interface 425 to identify or capture a query or issue for the business enterprise at the site of the origination of the question or problem. For example, if a customer has a question that presents itself from a certain webpage of the enterprise, then the customer is able to seek help to answer that question directly from that webpage. In another example, if a customer is shopping an online retailer and has a question about a particular product offering on a webpage, the customer is able to create an enriched video specifically identifying the portion of the webpage that raises the question without having to switch to another medium (e.g., email or phone call) to seek an answer.

The editable audiovisual interface 425 may include a recording object 435 to initiate the creation of the enriched video. The record object 435 may be presented as a text, button, graphic or known depiction. The record object 435 may be clicked on or selected to initiate creation of the enriched video. The recording object 435 may be selected a second time to terminate creation of the enriched video. The editable audiovisual interface 425 may include action objects 430a, 430b, and 430c (collectively 430). Action objects 430, comprising provided tools, may permit the user of the editable audiovisual interface 425 to talk, point, draw, comment, and zoom in on parts of the web browser objects 415. For example, once recording begins, a customer can start talking, zoom into a frame, and scribble annotations where required. Such gestures may be captured in synchronization with the accompanying audio and together create an audiovisual communication through the enriched video.

Figure 5:
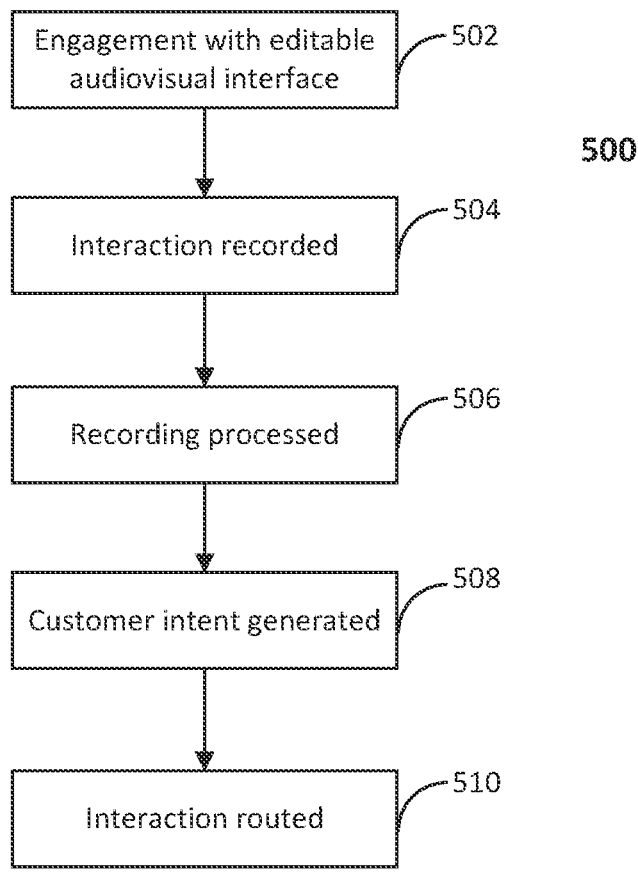
FIG. 5 is a flow diagram illustrating an embodiment of a process for an inbound asynchronous audiovisual channel using an editable audiovisual interface.

FIG. 5 is a flow diagram illustrating an embodiment of a process for an inbound asynchronous audiovisual channel using an editable audiovisual interface, indicated generally at 500. The process 500 may occur in the contact center 200.

In operation 502, a party browsing the website, such as customer, engages with an editable audiovisual interface 525. The customer may initiate engagement with an editable audiovisual interface 525 by clicking over the editable audiovisual interface engagement object 520 in the web browser window 510. For example, a customer may be browsing for a table at an e-commerce furniture store. Prior to shopping the e-commerce furniture store, the customer has certain expectations for the color, price, and specifications of the table. Not finding these expectations met on the website, the customer may seek to initiate engagement with an editable audiovisual interface 425 to express the expectations for the customer's desired table. It may be that the customer desires a table with black color for given specifications but can only locate a table in brown. The customer may also initiate engagement with the editable audiovisual interface 425 by: selecting a hyperlink presented on a web browser window 410, selecting a link provided through an email communication via web server 242, or through a link in a text or SMS communication on a mobile device via multimedia/social media server 234. Control passes to operation 504 and the process continues.

In operation 504, the customer interaction with the editable audiovisual interface 425 is recorded. The interaction can include actions taken on top of, and in concert with a web browser object 415. Action might include sketching, which comprises drawing, adding text, annotating, scribbling, highlighting, scrolling, pointing, zooming, etc. Referring to the table, after initiating a recording of the customer interaction, the customer may select an action object 430 for freehand drawing over a web browser object 415. In an embodiment, recording may be initiated by the customer clicking on the record object 435. The customer may draw a circle around a web browser object 415 of a table similar to the customer's desired specifications for the table. The customer may draw freehand over a web browser object 415. The customer may also type text ("I want this table in black") over the web browser object 415 of a table similar to the customer's desired specifications for the table. The customer may also initiate a speech recording as part of creating an enhanced video. The customer may conclude recording the interaction through the editable audiovisual interface 425 by clicking on (or selecting) the record object 435 a second time. Control passes to operation 506 and the process continues.

In operation 506, the recorded is processed. For example, the customer interaction may be processed through video and speech processing systems. The video processing system may analyze the recorded customer interaction for key actions taken by the customer during the session. The speech processing system may analyze the recorded customer interaction for spoken key words during the session. The audio video stitching system 211 identifies which portion of audio needs to be correlated/stitched with which portion of an action. The video processing system may recognize that a web browser object 415 the customer interacts with comprises a table. The speech processing system may recognize the customer used the words "black" and "table." Appropriate video and speech processing systems may be included as part of the audiovisual processing server 256 as described above. In an embodiment, the customer interaction may be analyzed by an audiovisual processing server 256, as described in greater detail below. Control passes to operation 508 and the process continues.

In operation 508, intent may be generated. For example, customer intent may be generated from the recorded interaction. The provided video and speech processing systems utilized at operation 506, along with the stitching system 211, may generate content information from the recorded customer interaction. The processing systems may generate an appropriate output, such as a JSON object, that can be utilized by other systems of the contact center 200. For example, the processing system may generate a customer's intent that they are seeking a black table, based on the processed video and speech from the recorded interaction. Additional information may be obtained, such as customer-identifying information (including customer contact information). Control passes to operation 510, and the process continues.

In operation 510, the interaction is routed. In an embodiment, the interaction may be routed to an agent for handling based on the derived customer intent. An appropriate routing device, such as routing server 218, may utilize the generated customer intent of operation 508 to determine the most appropriate agent to handle a response to the interaction. The agent may be an artificial agent, such as a chatbot directed by a multimedia/social media server 234, an IMR device directed by an IMR server 216, or a live agent utilizing an agent device 230. The routing device might determine a chatbot is the agent most likely to provide a response to meet the customer's expectations in the customer intent. The chatbot may be able to provide a link in a chat conversation overlaid in web browser window 410, providing a link to a suggested table that more closely meets the determined customer intent for that customer searching for a black table. In another embodiment, the routing device may also determine a live agent will most likely provide a response to meet the customer's expectations. The customer interaction may be forwarded to the agent device 230 of the agent, including the recording of the enhanced video, and the output of the processing system with the information of the determined customer intent. The agent may then use an appropriate communication channel, such as a web chat, video call, voice call, or email, etc., to handle the interaction. The generated customer intent provided to the agent device 230 can be viewed by the agent prior to watching video of the customer interaction.

In an embodiment, the interaction may be routed to a contact center analytics system for analysis and data storage based on the determined customer intent. An analytics system may be able to aggregate the determined customer intents and provide the business with market information about unmet customer expectations. The business enterprise may be able to use the aggregated customer intents to add, remove, or modify product offerings. For example, if the aggregated customer intent data shows a number of customers are seeking a black table, but the e-commerce furniture store does not presently offer a black table, then the e-commerce furniture store may seek to add a black table as part of its product offerings.

Figure 6:
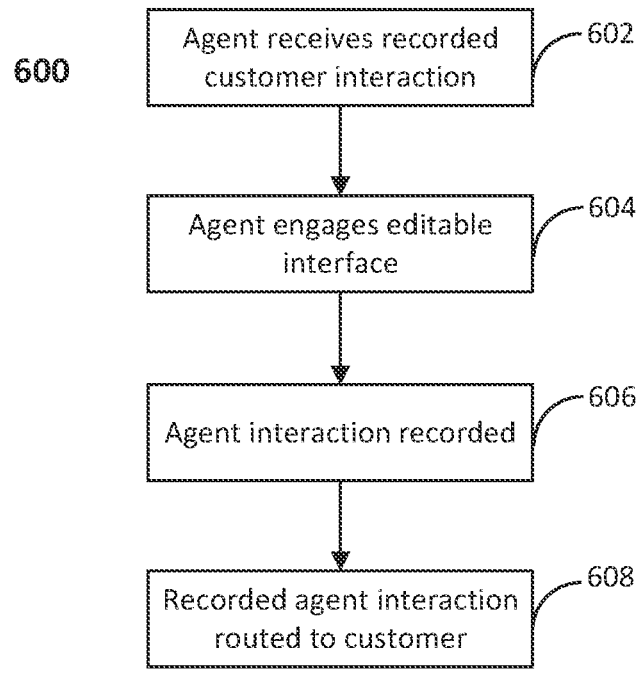
FIG. 6 is a flow diagram illustrating an embodiment of a process for an outbound asynchronous audiovisual channel using an editable audiovisual interface.

FIG. 6 is a flow diagram illustrating an embodiment of a process for an outbound asynchronous audiovisual channel using an editable audiovisual interface for a contact center, indicated generally at 600. The process 600 may occur in the contact center 200.

Just as a customer may utilize the asynchronous audiovisual channel to express the customer's expectations to the business enterprise through the contact center, an agent of the contact center may also utilize the asynchronous audiovisual channel to contact a customer. An agent may use asynchronous audiovisual channel to respond to a previously-received recorded customer interaction or respond to a communication from a customer received through other contact center channels, such as a voice call, text message, or web chat.

In operation 602, an agent receives a recorded customer interaction. In an embodiment, if a routing server 218 determines that a live agent would provide the best chance of a favorable resolution, then the routing device may transmit the recorded customer interaction for receipt by the workbin 232 of agent device 230 for handling by the agent. However, the editable audiovisual interface from the asynchronous audiovisual channel may be made available to a live agent to provide a contact with a customer even if the customer did not provide an incoming recorded customer interaction. Control passes to operation 604 and the process 600 continues.

In operation 604, the agent engages with the editable audiovisual interface. The agent can review the recorded interaction and edit the video using the editable audiovisual interface from the asynchronous audiovisual channel the customer utilized. In an embodiment, a live agent can activate the editable audiovisual interface 425 from the asynchronous audiovisual channel using an editable audiovisual interface engagement object 420 as part of the agent device 230. Once activated, the agent can interact with the editable audiovisual interface 425 in a manner as described in operation 602. Control passes to operation 606 and the process continues.

In operation 606, the agent interaction with editable interface may be recorded. In an embodiment, the agent interaction can include actions taken on top of, and in concert with a web browser object 415, such as sketching or the addition of speech. The agent may initiate recording of the interaction by clicking on record object 435. The agent may then select from the action objects 430 to mark up a web browser object 415. The agent may conclude recording by clicking on the record object 435 a second time, completing the creation of the enriched video. Control passes to operation 608 and the process continues.

In operation 608, the recorded agent interaction is routed to a customer and the process 600 ends. For example, the contact center may route the recorded agent interaction to the customer using appropriate means of the contact center (including information collected from the customer), such as the routing server 218, the multimedia/social media server 234, web servers 242, or other appropriate means of communication. In an embodiment, the customer may receive the agent interaction as a link to the recorded agent interaction embedded in an email, text message, or other appropriate application or channel for communication. In an embodiment, the recorded agent interaction may be preserved in an appropriate medium. The storage device 220 may also store the customer interaction and interaction data for other appropriate uses by a contact center for the business enterprise.

Figure 7:
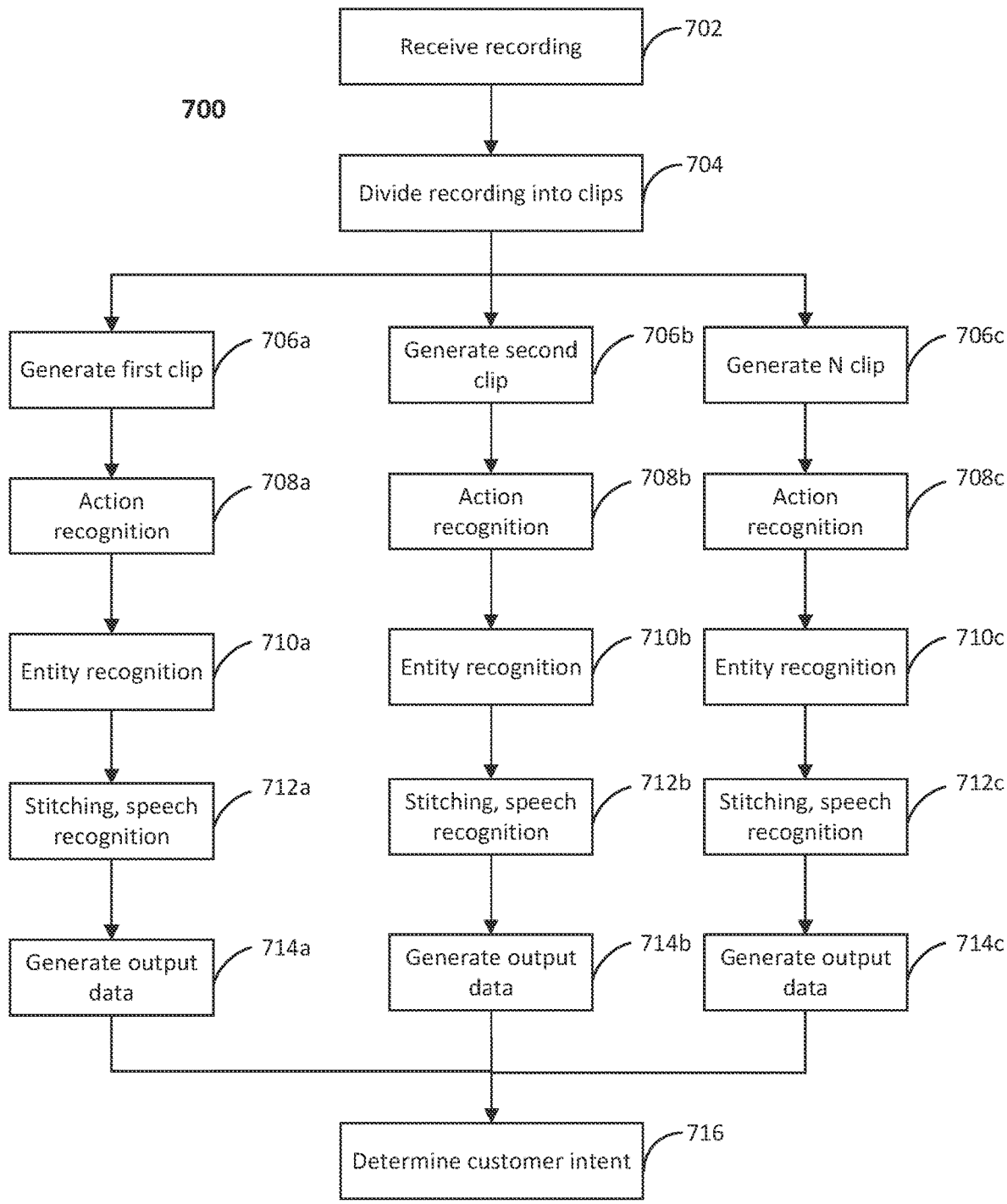
FIG. 7 is a flow diagram illustrating an embodiment of a process for audiovisual processing of the asynchronous audiovisual channel.

FIG. 7 is a flow diagram illustrating an embodiment of a process for audiovisual processing of the asynchronous audiovisual channel, indicated generally at 700. The process 700 may occur in the audiovisual processing server 256, or similar audiovisual processing system.

In operation 702, a recording is received by an audiovisual processing system. For example, the audiovisual processing server 256 receives an audiovisual interface recording generated through the editable audiovisual interface 425. Upon receipt of the recording by the processing system, control passes to operation 704 and the process continues.

In operation 704, the recording is divided into a plurality of video clips. In an embodiment, the dividing may be performed by the feature detection application 206 as part of the video processing system 205. The feature detection application 206 may use Scale-invariant feature transformation (SIFT) to split the input video into frames. Each frame of the editable audiovisual interface recording is processed and compared with the surrounding frames. The comparison is searching for movement or pauses. For example, where there is movement in the editable audiovisual interface recording, such as when a customer draws a freehand circle on the screen (to name a non-limiting example), the frames of the video change constantly and the methodology recognizes that there is a continuous action being performed. In another example, when there is a pause between the actions the frames remain identical, and feature detection application 206 can record the frame in the video corresponding to where there is a pause between the actions. After feature detection application 206 completes processing and recording the frame(s) in the video corresponding to where there is a pause between the actions, control of operation 700 passes to operation 706 and the process continues.

In operation 706, a plurality of shorter audiovisual clips are generated from the editable audiovisual interface recording. For simplicity, this is illustrated in FIG. 7 as 706a, 706b, and 706c (collectively 706). Any number of audiovisual clips may be generated where N (606c) represents this. Utilizing the analysis performed by feature detection application 206 to determine pauses in action from the editable audiovisual interface recording, the audiovisual clips are generated by dividing the editable audiovisual interface recording at the determined pauses in the action. FIG. 7 depicts the generation of at least three unique clips from audiovisual interface recording, but the number of clips generated is not set at three, as 1 to n number of clips could be generated from the audiovisual interface recording. Upon receipt of the audiovisual interface recording by the processing system, control of operation 700 passes to operation 708 and the process continues.

In operations 708a, 708b, and 708c (collectively 708), action recognition is performed on each of the generated audiovisual clips from operation 706 respectively. Action recognition may be performed by an appropriate processing system, such as the action detection application 207. Action detection application 207 may deploy an appropriate methodology to classify frames in a video, such as determine an action being taken on a particular object in the frame of the video. For example, if a circle is drawn in the video of a generated audiovisual clip, then action detection application 207 may be configured to detect that an action has occurred during the time period of the circle being drawn. Action detection application 207 may also denote the location in the frame of the video the action is being performed. The OCR application 208 may be configured to detect and recognize text typed during the incoming video file to determine text written over frames in the incoming video file. Control of operation 700 passes to operation 710 and the process continues.

In operations 710a, 710b, and 710c (collectively 710), entity recognition is performed on each of the generated audiovisual clips. Entity recognition may be performed by an appropriate processing system, such as the action detection application 207. Using the identified location in the frame of the video the action is being performed from operation 708, action detection application 307 may identify any objects on screen that are associated with the detected action from operation 708. For example, if a circle is drawn around a picture of a table in the video of a generated audiovisual clip, then action detection application 207 will seek to recognize the table in the video frame at operation 710. Control of operation 700 passes to operation 712 and the process continues.

In an embodiment, operations 708, 710, and 712 do not need to occur in the order illustrated at 700 but may occur in an order set by an administrator or chosen by the contact center.

In operations 712a, 712b, and 712c (collectively 712), the stitching system 311 identifies the audio portion relevant to the video action and stitches these together. Speech recognition is performed on each of the generated audiovisual clips. Speech recognition may be performed by an appropriate processing system, such as the speech recognition system 310. The speech recognition system 310 may be configured to detect and recognize speech patterns and transcribe the spoken words into written text. Speech recognition system 310 may deploy an appropriate methodology to recognize spoken words in an audio file. For example, Natural Language Processing (NLP) and Supervised Machine Learning (ML) may be deployed in speech recognition system 310. The speech recognition system 310 may generate text information synchronized with certain actions detected by the action detection application 314. Control of operation 700 passes to operation 714 and the process continues.

In operations 714a, 714b, and 714c (collectively 714), output data from the audiovisual processing of the audiovisual clips is generated. For example, the output data combines the data generated from the action recognition 708, the entity recognition 710, and the speech recognition 712 into an output data. Control of operation 700 passes to operation 716 and the process continues.

In operation 716, a customer intent is determined from the output data from the audiovisual processing of the audiovisual clips from operation 714. For example, an appropriate processing system will correlate together information gathered in the process 700 to extract different parameters from the intent. A determined customer intent may include, for example, a desire for a particular product or service offering, a desire for a modification from a particular product or service offering, a customer mood (i.e. is the customer angry?), the urgency of the concern raised by the customer, and an identification of an appropriate department for handling a response to the recording. Routing parameters may also be generated for routing to an appropriate agent for handling. In an embodiment, the determined customer intent may be expressed as a JSON object, a BSON object, YAML format, etc.

Figure 8A:
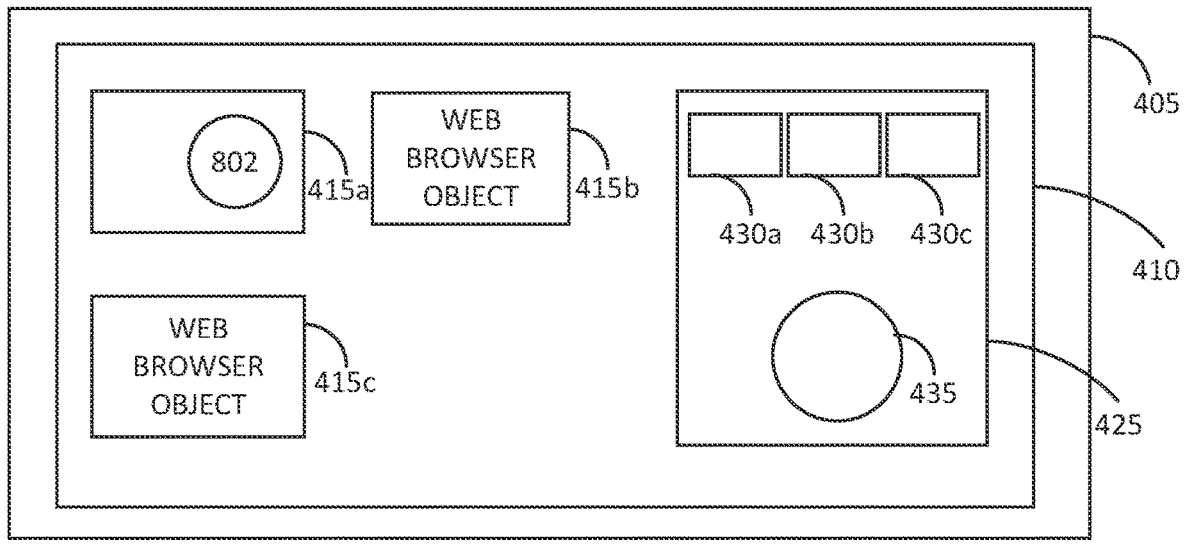
FIG. 8A is a diagram illustrating an embodiment of a web-connected customer device displaying a web browser window and an editable interface.

FIG. 8A is a diagram illustrating an embodiment of a web-connected customer device displaying a web browser window and an editable interface, indicated generally. FIG. 8A comprises an interface point 802 for a web browser object in the web browser window. The web object interface point 802 provides an interaction point for the editable audiovisual interface 425 to interact with a web browser object 415a. In an embodiment, the web object interface point 802 may be depicted as a visual representation, such as a circle shown on web-connected customer device 402 or may be a "virtual" circle without a depiction on web-connected customer device 402. Web object interface point 802 permits the customer to access additional information associated with a web browser object 415 through customer selection.

Figure 8B:
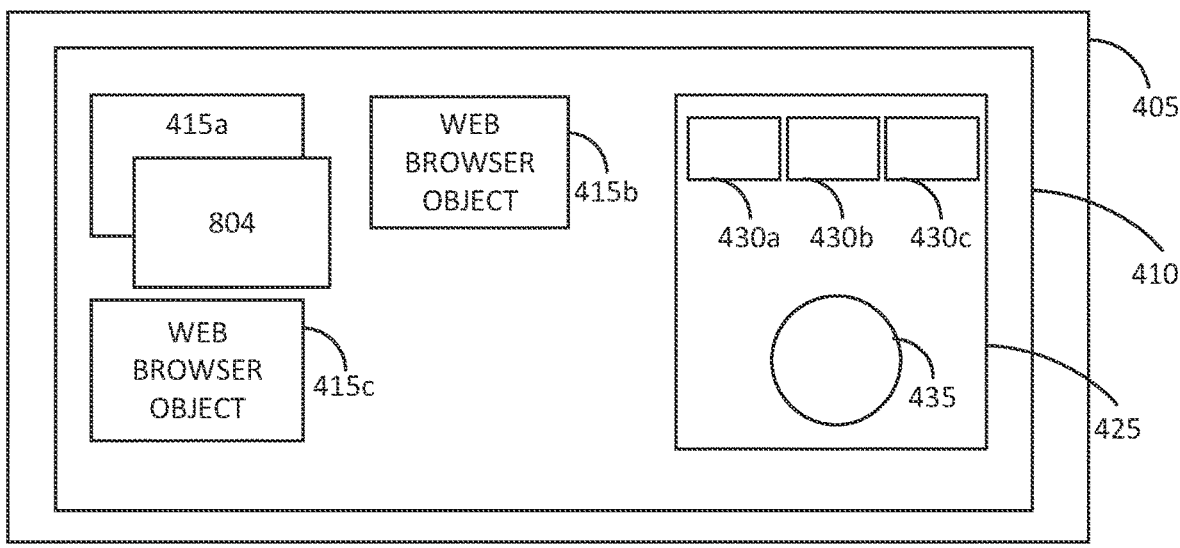
FIG. 8B is a diagram illustrating an embodiment of a web-connected customer device displaying a web browser window and an editable interface.

FIG. 8B is a diagram illustrating an embodiment of a web-connected customer device displaying a web browser window and an editable interface, indicated generally. In an embodiment, FIG. 8B may further comprise a pop-up frequently asked questions window. After the customer interacts with web object interface point 802, a recommendation window 804 may appear on the web-connected customer device 405. Recommendation window 804 may contain content generated through the recommendation engine 170 associated with content determined by information derived from other customer's recordings from the editable audiovisual interface 425. Recommendation window 804 may appear as a list of previously-identified issues or frequently-asked questions associated with the interface point 802 linked with web browser object 415. In an embodiment, the recommendation window may appear as a list of issues most commonly asked for an entity, a webpage, or by a customer, or any combination of these.

Figure 9:
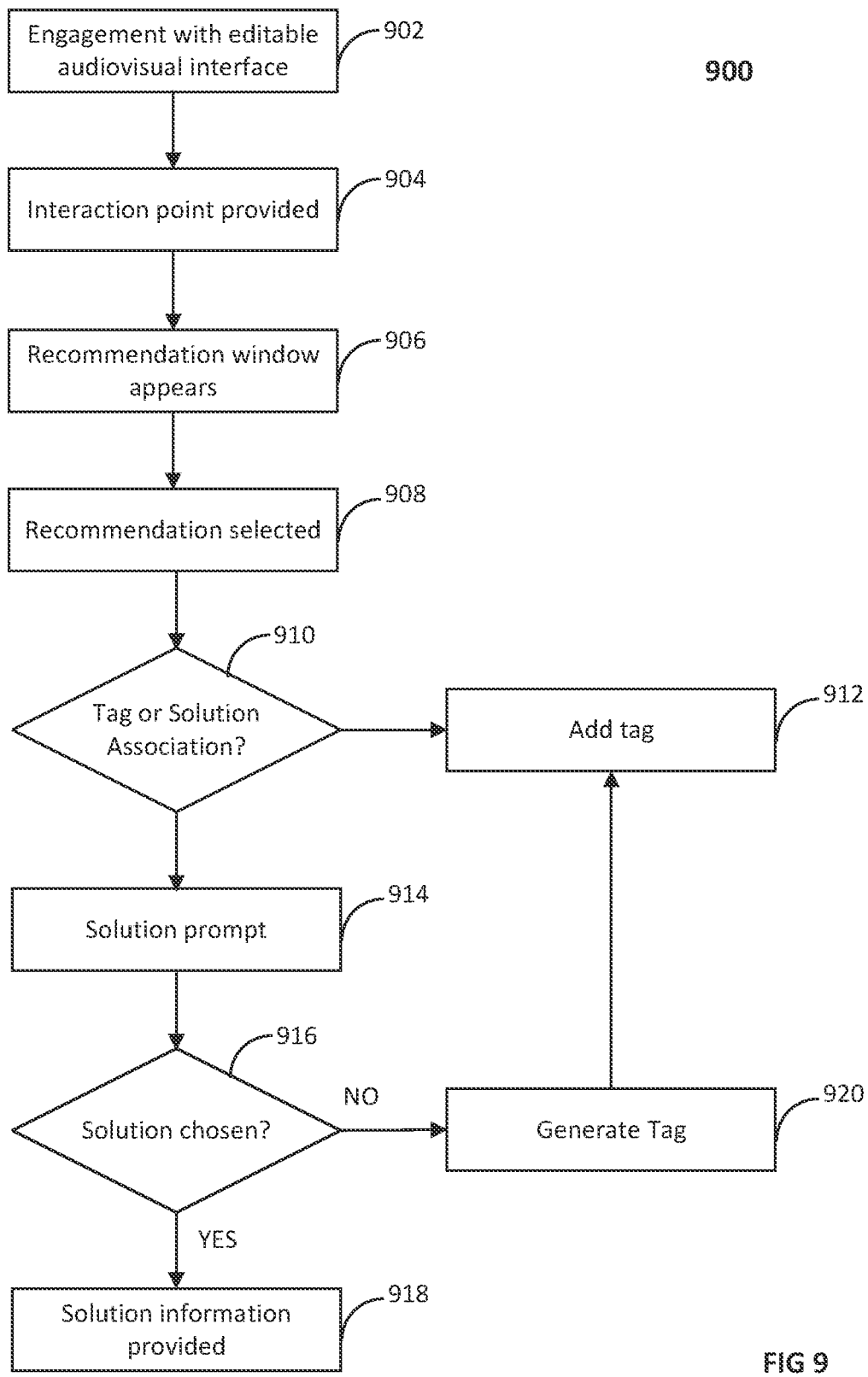
FIG. 9 is a flow diagram illustrating an embodiment for providing recommended asynchronous solutions through an asynchronous audiovisual channel.

FIG. 9 is a flow diagram illustrating an embodiment for providing recommended asynchronous solutions through an asynchronous audiovisual channel, indicated generally at 900.

In operation 902, a customer engages the editable audiovisual interface 425. The customer may initiate the editable audiovisual interface 425 as previously described in operation 404 of operation 400. Editable audiovisual interface 425 may be then displayed on the web-connected customer device 402. Control passes to operation 904 and the process 900 continues.

In operation 904, editable audiovisual interface 425 provides an interaction point on a web browser object 415. The interaction point may use an interface as the disclosed web object interface point 902. An interaction point may be provided for each web browser object 415 or only certain web browser objects 415. A visual indication may also be provided when the interface point 902 is selected. Control passes to operation 906 and the process continues.

In operation 906, a recommendation window appears when the customer interacts with the interface point 902. For example, the recommendation window may appear as recommendation window 904, which may include a list of recommendations or previously-asked questions. The contents of the list may be received from a recommendation server 170. The recommendation engine on the server 170 may be prepopulated using data from mass storage device 220 including agent data, customer data, and interaction data to compile a list of known questions and answers about the goods and/or services offered by a business. The recommendation engine may use information extracted from previous interactions of customers utilizing the asynchronous audiovisual channel. For example, the recommendation engine may use a determined intent (e.g. "customer wants the table in black color") to add to a question posed to the recommendation engine (e.g. "Is this table available in a different color?"). The recommendation engine may associate specific goods and/or services offered by the business with specific previously-asked questions concerning those specific goods and/or services. The recommendation engine may associate specific goods and/or services with particular web browser objects 415 indicative of those goods and/or services, thereby associating specific previously-asked questions with particular web browser objects 415. The recommendation window 804 may provide a specific number of recommendations associated with a particular web browser object 415, at a predetermined number of recommendations or by a set threshold associated with the quality of the recommendation. Control passes to operation 908 and the process continues.

In operation 908, the customer selects a recommendation from the recommendation window 804 at operation 908. The customer selection may be made by, for example, clicking on a recommendation populated in the recommendation window 804. Control passes to operation 910 and the process continues.

In operation 910 it is determined whether the selected recommendation from operation 908 is associated with a known solution or an issue tag (alternatively referred to herein as a Recommended Option Tag). If it is determined that the selected recommendation is associated with a known solution, then control passes to operation 914 and the process continues. If the selected recommendation from operation 908 is associated with an issue tag, then control passes to operation 912 and the process continues.

A known solution may be defined as a determined answer to the recommendation posed as a question. For example, for the recommendation "Is this table available in a different color?", a recommendation with a known solution would have a response to the question, such as "Yes, the table is available in white" or "No, the table is not available in another color." An issue tag is associated with recommendations that currently do not have determined answers to the recommendation posed as a question. For example, for the recommendation "Is this table available in a different size?" may only have an issue tag of "size" associated with the recommendation if the recommendation engine does not have a known response to this question.

In operation 912, the issue tag associated with the selected recommendation is associated with the current customer interaction. The issue tag could be presented as a combination of different media. In this case, if the selected recommendation "I wish to know about other colors," is selected from recommendation window 804, then this tag of "I wish to know about other colors" will be added to the editable audiovisual interface recording. Operation 900 ends, permitting the customer using the editable audiovisual interface to continue making a recording through the editable audiovisual interface. In an embodiment, the interaction may be sent to a live agent for handling.

In operation 914, the customer is prompted with the option to see the known solution associated with the selected recommendation. For example, the known solution may be provided to the customer in the form of a text from a frequently asked question, a link to another portion of the website, a previous recording through the asynchronous audiovisual channel, or through other acceptable methods of communicating information to the customer. The known solution may also provide a summary of its contents to the customer with the option to see the known solution associated with the selected recommendation. Control is passed to operation 916 and the process continues.

In operation 916, it is determined whether the customer accepts the known solution provided to the customer in response to the selected recommendation. If the customer accepts the known solution, then the known solution is presented to the customer at operation 918 and the operation 900 ends. This indicates the customer finds the known solution acceptable and no further information may be required to provide to the customer. If the customer does not accept the known solution, then the known solution may not be an acceptable response to the selected recommendation and further refinement of the known solutions associated with the selected recommendation may be needed by the recommendation engine. If the customer does not accept the known solution, then control of operation 900 passes to operation 920, whereby an issue tag is generated from the selected recommendation and operation 900 continues back to operation 912.

In accordance with alternative embodiments, in certain cases, systems and methods disclosed herein may be configured to enable a customer to submit a service request by simply submitting an image of a product. This, for example, may include instances when a product is damaged or not functioning correctly. The customer may simply submit an image taken by the customer of the product that shows the damage or other issue. In this way, a customer is able to initiate an interaction with a contact center by simply uploading an image that they take of the product using, for example, the camera on their phone. In such cases, systems and methods of the present invention may be configured to identify an intent or problem statement for the interaction from the image alone. As will be appreciated, this functionality saves the need for the customer to provide additional information, such as, for example, through the above-described editable audiovisual interface. While present embodiments may draw upon aspects of the systems and methods already disclosed, they also will be augmented with additional functionality and capabilities, as will now be described. As will further be understood, it is anticipated that aspects of the editable audiovisual interface may be combined with the present embodiments to form additional embodiments that leverage the advantages of both approaches.

By way of background, a common issue in the customer service industry is the difficulties customers have in accurately describing the nature of their problem to a customer service representative. This issue is magnified when the issue involves a defective or damaged product and involves technical know-how. Whether the customer is describing the issue through a synchronous communication, such as voice or chat, or asynchronous communication, such as email, customers often lack the right words or technical knowledge to describe the issue properly. Thus, while conventional mobile applications may make it more convenient for a customer to provide such description by voice or text, the customer still must take the time to describe the problem, which is an inconvenience in itself. Further, to the extent that the description provided by the customer is not complete or inaccurate in some way, it might result in delays or inefficiencies in getting the customer a proper resolution.

One way to address these communication shortcomings is disclosed above in the form of the editable audiovisual interface. In certain instances, the convenience to the customer may be further enhanced through greater automation that removes the need for the customer to provide edits via the editable audiovisual interface. That is, in the present embodiment, customers are able to submit a service request or report a problem to customer service by simply providing an image of the product, such as via a photo or video, that visually shows the problem. In accordance with exemplary embodiments, this may be accomplished via an application that includes an image processing system. The application, including aspects of the image processing system, may reside on and be implemented by a customer's smartphone.

In exemplary embodiments, an interface is provided by the application that has a camera option in which the camera of the smartphone can be accessed and used to create the image. Alternatively, a stored image may be uploaded. In an alternative embodiment, the application may provide the customer with a microphone/text box option so that the customer can add a caption to the image. Once the image is submitted, the application, via the image processing system, analyzes the image to gleam relevant information toward identifying the problem and resolving it. For example, from the image, the image processing system may determine the product specifics (i.e., what the product is, vendor name, product model, etc.). The image processing system may then detect the problem via visual clues and frame a problem statement for the customer. The application then may get confirmation from customer as to whether the problem statement is correct. Once this is confirmed as correct, the application may determine the appropriate contact center for the customer to contact. The application may then facilitate the connection or send a communication on the customer's behalf that initiates the interaction with the contact center. As part of the communication, the application may provide the initial information regarding the product and the problem statement as well as any relevant information that may be stored in the customer's profile data, such as date of purchase, warranty information, etc. Additionally, the application may schedule a time for the contact center to contact the customer given knowledge provided to the application by the customer of the customer's schedule or time-of-day preferences for handling such issues.

As an example, consider a case in which a customer, John Smith, recently purchases a digital SLR camera and later damages the screen to it. Customer Smith wants to discuss this issue with a customer service representative of the manufacturer or vendor to inquire as to whether it is fixable, what he needs to do next, how to make a service request related to the damaged screen, etc. As will be appreciated, there are many details that are relevant to the resolution of this issue that Customer Smith needs to initial provide to initiate an interaction in an efficient manner, such as, for example, the severity of the damage, the position of the damage, whether the damaged screen can still show an image and, if so, the clarity of the image, etc. Each of these points can be difficult to fully express with plain text. Further, the customer also needs to know the make and model of the camera as well as details regarding the purchase of the camera. Often such information is either forgotten or not readily available to the customer.

Using the application of the present invention, Customer Smith may simply access the camera feature on his smartphone and take a picture of the broken screen. The image is then uploaded by the application to the image processing system where it is then analyzed. From the analysis, the image processing system determines that manufacturer and model of the digital camera. From the analysis, the image processing system further determines that the screen is damaged, the location of the damage, the severity of the damage, etc. Given these determinations, a problem statement is determined, for example, the problem statement may state: "Customer John Smith would like to report damage to the screen of a Nikon Digital SLR Camera, Model No: 22XR, with the damage indicating that the screen is over 60% broken and unable to display an image." The problem statement may be displayed to the customer to determine correctness. The application may further determine the appropriate contact center to contact in relation to the problem statement, including the appropriate resource within the contact center. From there, the application may facilitate the communication with the contact center, as discussed more below.

Figure 10:
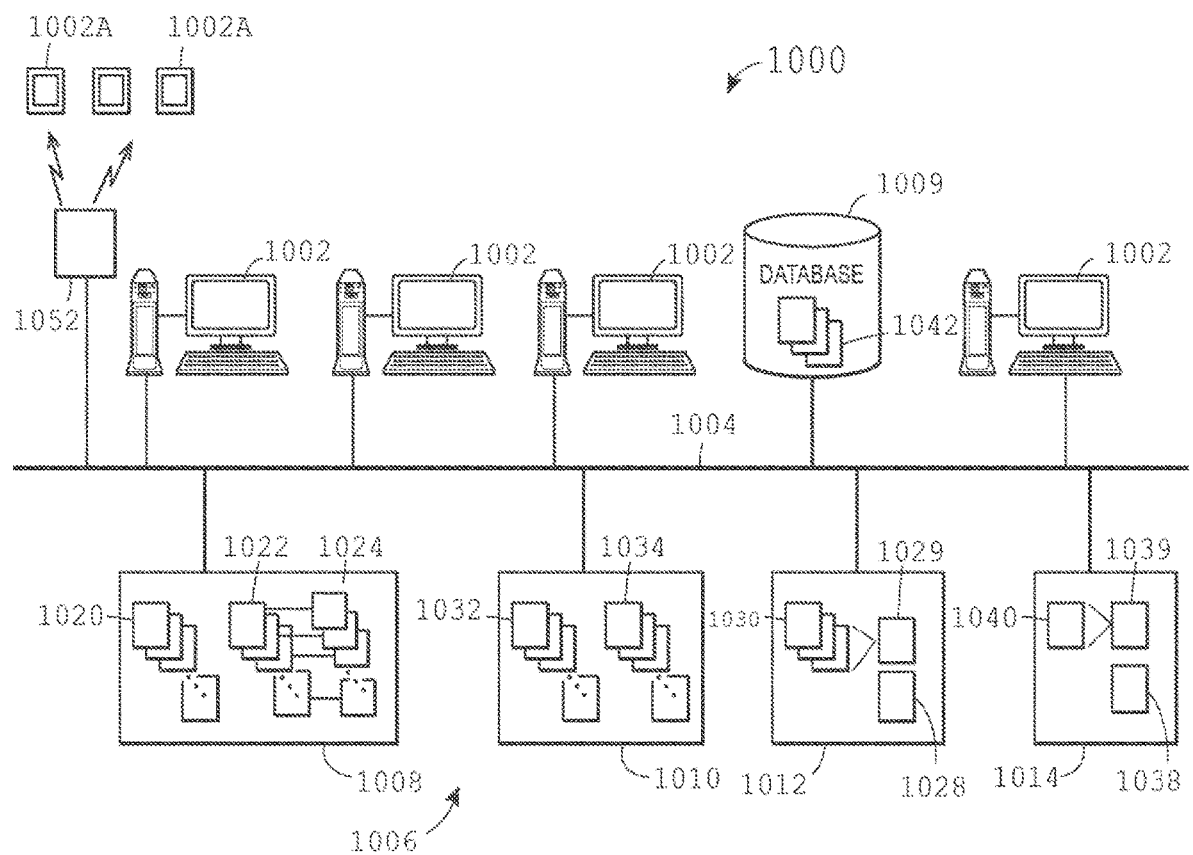
FIG. 10 is a diagram of an image processing system according to an exemplary embodiment of the present invention.

With reference now to FIG. 10, an exemplary image processing system 1000 is shown that may be used to analyze an image toward achieving the above-described functionality. Additional information related to image processing and the functionality of system 1000 is provided in U.S. Pat. No. 10,319,094, filed on May 20, 2016, entitled "Technology for Capturing, Transmitting, and Analyzing Images of Objects", the content of which is incorporated herein by reference. As will be appreciated, the image processing system 1000 may be configured as an integrated component within the audiovisual processing server 256. Aspects of the imaging processing system 100 also may reside on the smartphone of a customer and communicate with remote components. It will be appreciated that the image processing system 1000 may be used to determine changes to a target object, automatically, generally by determining differences between one or more images of the target object as changed and one or more images generated from a base model of the object representing the object prior to the changes occurring to the object. After changes to the target object have been determined and quantified in some manner, further processing systems, which may be incorporated into the image processing system 1000, may be used to determine secondary characteristics or features associated with the target object, such as the amount of change or damage to the target object (assuming that the changes to the object represent damage), costs associated with repairing or replacing the target object, the time it may take to repair the target object, the progress the target object has undergone in changing states, etc.

As illustrated in FIG. 10, the image processing system 1000 may include various user interface devices 1002, which may be general purpose computers, handheld devices, workstations, etc., connected through one or more communication networks 1004, to one or more further computing devices 1006 which may operate as servers and/or databases in a traditional client-server or cloud-based network. For example, the further computing devices or servers 1006 may include one or more databases 1008, 1009, and 1010, and one or more servers 1012 and 1014 having computer processing and storage capabilities. In this case, the database 1008 may store one or more base object models 1020 (which may be, for example, two-dimensional and/or three-dimensional object models) defining or depicting one or more base objects upon which change detection image processing may be performed. Moreover, the database 1008 may store changed or example target image files 1022, which may be files that include images of changed target objects illustrating various manners in which changes to the base objects within the base object models 1020 may occur. Still further, the database 1008 may store information files 1024 relating to or providing specific information about each of the changed target image files 1022 or the changed objects within the changed target image files 1022.

The image processing system 1000 may be used to detect changes to virtually any type of consumer product. For the sake of an example, the image processing system 1000 will be described as detecting changes a motorcycle, such as to detect damage caused to the motorcycle in an accident. In this case, the base object models 1020 may be three dimensional (or two dimensional) models of various motorcycles upon which changes may be detected. Generally in this case, a different base object model 1020 will be stored for each make/model/year of motorcycle that is to be analyzed for damage. Still further, in this example, each of the changed image files 1022 may include one or more images of a damaged motorcycle (conforming to one of the make/model/year types, for example, of the base object models 1020 stored in the database 1008). Generally, each such changed image file 1022 may include digital photos taken of a particular motorcycle that has been damaged in, for example, an accident. Such photos may be collected by, for example, owners of the motorcycles depicted in the photos, a motorcycle insurer against whom an insurance claim was made for repairing or replacing the damaged motorcycle, etc. Still further, each of the information files 1024 may store information pertaining to the damaged motorcycles in one of the changed target image files 1022, such as the make/model/year of the damaged motorcycle, the country, state, city, zip code, and/or other geographical region in which the motorcycle damaged, the mileage of the damaged motorcycle, the color of the damaged motorcycle, the type of or location of the damage to the motorcycle, telematics data obtained from or about the damaged motorcycle associated with the accident, the parts which needed to be repaired or replaced as a result of the damage, the cost of repair or replacement of each such part, the type of damage to each such part, the cost of repair of the motorcycle if the motorcycle was repaired, etc. Of course, other information could be stored for any or all of the changed target image files 1022, and the type of information stored for each of the changed target image files 1022 may vary depending on use, the type of object upon which change detection is to be performed, etc. As will be described in more detail herein, the base object models 1020, the changed target image files 1022, and the information files 1024 may be used by the image processing system 1000, for example, to perform primary and secondary processing on photographs of a newly damaged motorcycle to determine the type of and/or the extent of damage (change) to the damaged motorcycle.

The server 1012, which may include a microprocessor 1028 and a computer readable memory 1029, may store one or more image processing training routines 1030. The training routines 1030 may be implemented on the microprocessor 1028 using the base object models 1020, and the images and data within the files 1022 and 1024 to generate various other components used in a further image processing routine that operates to determine changes to target objects (which are represented by one of the base object models 1020) on which changes have occurred but for which changes have not been quantified. In one example, one or more of the training routines 1030 may determine a set of correlation filters 1032 (also referred to as difference filters) for each of the target objects, and one or more of the training routines 1030 may determine a set of convolutional neural networks (NNs) 1034, e.g., convolutional neural networks, for the objects represented by each of the base object models 1020. The correlation filters 1032 and the NNs 1034 are illustrated in FIG. 10 as being stored in the database 1010, but these components could be stored in other memories associated with the image processing system 1000 if desired.

Thus, generally speaking, and as will be described in further detail herein, the image training routines 1030 use the base object models 1020, the changed image files 1022, and the image information files 1024 to produce and/or select the correlation filters 1032 and the NNs 1034, in one example, that will be used by the image processing system 1000 to detect changes to target objects (such as to detect damage to motorcycles) based on images of the target objects, such as based on photographs of damaged motorcycles. In one example, the image training routines 1030 may calculate, for each of the base object models 1020, a set of correlation filters 1032 and a set of NNs 1034 based on the training set of data in the changed target image files 1022, and these tools 1032 and 1034 may be stored and then later used to detect damages on images of target objects for which changes to the target objects (such as damage to the target object) is unknown or not quantified.

Moreover, as illustrated in FIG. 10, the server 1014, may include a microprocessor 1038 and a memory 1039 that stores an image processing routine 1040 that may perform image processing on a set of target images 1042, which images depict a target object represented by one of the base object models 1020, but upon which change has occurred, to thereby detect changes to the target object, such as to detect or quantify damage to the target object. In this case, the images 1042, which may be stored in the database 1009 for example, represent the target object as changed or altered with respect to the same object as represented by one of the base object models 1020. Generally speaking, the image processing routine 1040 may use the base object model 1020 corresponding to the target object, the correlation filters 1032 and the NNs 1034 (as stored in the database or memory 1010) corresponding to that base object model 1020, as well as the set of target images 1042 for the target object to detect changes that have occurred to the target object, where the changes are represented or depicted within the set of target images 1042 of the target object.

During operation, a customer may log onto or access the system 1000 via one of the user interfaces 1002, may upload or store a new set of images 1042 of a target object in the database 1009, and may additionally provide or store information in the database 1009 related to the new set of images 1042. The customer may then initiate the image processing routine 1040 to operate on the new set of target images 1042 to detect changes within the target object depicted in the new set of target images 1042 as compared to the base object model 1020 for that same object. Of course, the new set of target images 1042, along with information related to the new set of target images 1042, may be stored in the database 1009 and/or provided to the database 1009 in other manners, such as via a direct or indirect connection to a camera, via another device in the communication network(s) 1004, e.g., via a handheld device 1002A connected to the network(s) 1004 via a wireless interface 1052, etc.

Generally speaking, once initiated, the image processing routine 1040 will operate to detect changes to the target object depicted in the new set of target images 1042 as compared to the target object as represented by a base object model 1020 for that same object to, for example, detect and quantify changes to the target object, such as damage to the target object. Generally speaking, the image processing routine 1040 will use the correlation filters 1032 and the NNs 1034 to detect differences between the target object depicted in the new set of target images 1042 and information about the target object as stored in the base object model of the object 1020 to determine an amount of, or a quantification of change, such as damage, to the target object as depicted in the target images 1042. The image processing routine 1040 may then provide this change detection information to the customer via one of the user interfaces 1002, 1002A in any of various different manners in the form of a proposed problem statement. More particularly, the image processing routine 1040 uses the correlation filters 1032 or other difference filters to detect one or more predetermined landmarks (of or on the target object) in each of the target images 1042 and uses these landmarks to detect the positioning, orientation, depth of field, etc. of the target object as captured in the target images 1042. The image processing routine 1040 then uses these landmarks to perform a multi-dimensional alignment between the base object model 1020 (associated with the target object depicted in the target images 1042) and the target object as actually depicted in the target images 1042. Such a multi-dimensional alignment may include matching or aligning the three-dimensional orientation and depth of field or other positioning of the target object as depicted in one or more of the images 1042 with the base object model 1020. This multi-dimensional alignment may also include detecting and correcting for camera distortion introduced into the target images 1042 by the camera that took those images. In one case, the image processing routine 1040 may then generate one or more images of the target object from the base object model 1020 that are aligned with the target object as depicted in the target images 1042 and use these aligned images to detect and eliminate background information in the target images 1042 as well as to detect various components or parts of the target object as depicted in the images 1042. In another embodiment, the image processing routine 1040 may use the landmarks to create a composite image or model of the target object from the set of target images, enabling the target object, as depicted in the target images, to be modeled in, for example, three-dimensions and thereby be rotated, zoomed into and out of, etc. This model of the target object may then be aligned with the base object model 1020 to enable comparisons between the two objects.

Thereafter, the image processing routine 1040 uses the NNs 1034 to detect change parameters for each of the various components or parts of the target object as depicted in the images 1042 or the composite target object model created from the images 1042. Such change parameters may include, for example, indications of points or areas of change (e.g., damage), the probability of change at each point or area, the severity of change at each point or area, the type of change at each point or area, etc. These change parameters may then be used to generate a heat map, wherein the heat map is indicative of, corresponds to, and/or defines the areas of change to the target object depicted in the target object images 1042 as compared to the same object as defined by the base object model 1020. This heat map may be displayed to the customer for confirmations. Likewise, these change parameters may be used to determine secondary factors or features associated with the target object, such as cost to repair the changes, the estimated time it will take to repair the changes, an indication of a degree of metamorphosis of the object from one state or condition to another state or condition, etc. To initially set up the image processing routine 1040 for use in detecting changes to particular objects, such as to detect damage of a particular type of object (e.g., as represented by a particular base object model 1020), an operator may access the training routines 1030 via one of the user interfaces 1002, 1002A and may execute the training routines 1030 to create the correlation filters 1032 and the NNs 1034 needed for the image processing routine 1040 for the particular object to be analyzed. Thereafter, these tools 1032 and 1034 may be stored in the database 1010 for example, for later use by the image processing routine 1040. Generally speaking, the training routine 1030 will access the base object model 1020 for a particular object as well as a training set of data associated with the base object model 1020 (e.g., a training set of images stored in the associated changed target image files 1022 and the information about these objects as stored in the associated information files 1024), and will process the training set of data as compared to the base object model 1020 for the object to determine a set of processing tools needed by the routine 1040, including for example, the correlation filters 1032 and the NNs 1034. The training routine 1030 may then store these processing tools in the database 1010 for later use by the processing routine 1040.

While it will be understood that the image processing system 1000 of FIG. 10 is illustrated as a hardwired system having various servers and databases 1006 connected to various user interfaces 1002 via a hardwired communication network 1004, other processing and communication configurations could be used as well or instead. For example, the network 1004 could be a wireless communication network, or could be a combined wired and wireless communication network, and the network 1004 may include any type of communication network, including a public local area network (LAN) or wide area network (WAN), a private LAN or WAN, a set of direct communication connections, etc. Moreover, the network 1004 may include or use the Internet or the World Wide Web, to enable customers at the user interfaces 1002 and 1002A to communicate with the servers and databases 1006 via an Internet connection to upload photos or images of a target object for which change is to be detected to the database 1009, to initiate the image processing routines 1030 or 1040, to view the results of the routine 1040, etc. Still further, while the servers and databases 1006 are illustrated in FIG. 10 as including five different devices that have different information stored therein, any number of servers, databases, and/or other computing devices could be used and, in fact, the elements illustrated in the servers and databases 1006 of FIG. 10 could be stored within or distributed among more or less than five devices. For example, these components could be all stored in the same computer processing device, which could be the same computer processing device as one of the user interfaces 1002 or 1002A. In another example, at least some (or all) of these components could be implemented using a computing cloud architecture. Thus, the architecture of the image processing system 1000 of FIG. 10 could be changed to include more or less computer devices connected in various different manners and still function as described herein.

Figure 11:
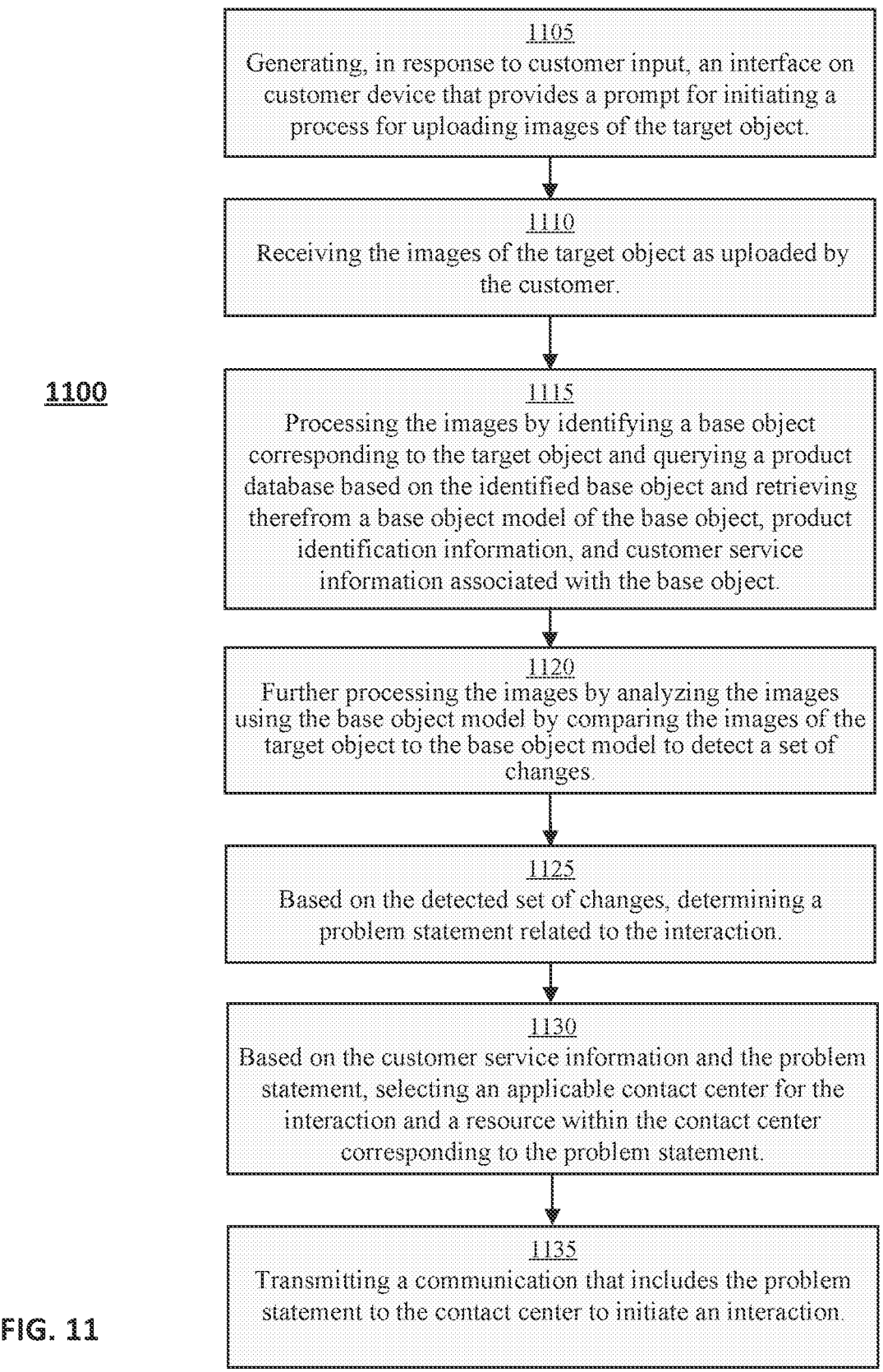
FIG. 11 is a method related to facilitating customer-initiated interactions via processing images provided by the customer of a product.

With reference now to FIG. 11, an exemplary method 1100 is provided in accordance with the present invention. The method 1100 may be used to initiate or facilitate an interaction for a customer with a contact center. As stated, the interaction may relate to a problem or issue the customer is having with a target object, i.e., a product owned by the customer. At an initial step 1105, the method 1100 may include generating, in response to an input by the customer, a first interface on a web-enabled customer device associated with the customer that comprises a prompt for initiating a process by which the customer uploads one or more images of the target object. This may include the user interfaces already described in which the customer accesses the camera feature on a smartphone for taking a picture of the object and then uploading that picture.

As a next step 1110, the method 1100 may include receiving the one or more images of the target object as uploaded by the customer and then continue with several steps related to processing the received one or more images. For example, as shown, at a step 1115, the method 1100 may include processing the images by identifying a base object corresponding to the target object and querying a product database based on the identified base object and retrieving therefrom a base object model of the base object, product identification information, and customer service information associated with the base object. At a next step 1120, the method 1100 may include analyzing the one or more images using the base object model of the base object by comparing the one or more images of the target object to the base object model to detect a set of changes.

At a step 1125, the method 1100 may include determining a problem statement for the interaction based on the detected set of changes.

At a step 1130, the method 1100 may include selecting an applicable contact center as the contact center for the interaction. This determination may be based on the determined customer service information and the problem statement. Additionally, the step may further include selecting a particular resource within the contact center that corresponds to the problem statement. As an alternate step, not shown, the method may include generating a second interface on the device that includes a confirmation prompt requesting confirmation from the customer as to a correctness of the problem statement.

At a final step 1135, the method 1100 may include transmitting a communication to the contact center related to initiating the interaction. The communication may include the problem statement, as well as other information, as described below. This action may be taken after receiving an input from the customer indicating confirmation as to the correctness of the problem statement.

In alternative embodiments, the step of transmitting the communication to the contact center related to initiating the interaction may include: providing the communication to a routing server of the contact center; selecting, from amount several candidate agents, a selected agent for receiving the interaction based, at least in part, on the problem statement; and transmitting, by a routing server of the contact center, a signal for routing the interaction to the selected agent of the contact center. In alternative embodiments, the selected agent may include a virtual agent. In alternative embodiments, the interaction may include an asynchronous interaction. Further, in alternative embodiments, the set of changes relates to visually detectable damage to the base object.

In alternative embodiments, the step of identifying the base object corresponding to the target object may include comparing the uploaded one or more images of the target object against candidate base objects to determine a match thereto. In alternative embodiments, this match includes matching the target object to the base object so to determine a particular model and year of manufacture of the target object.

In alternative embodiments, the method may further include the steps of: querying, using the product identification information, a customer profile database corresponding to the customer to locate purchase information stored therein related to a purchase of the target object by the customer; and retrieving the purchase information. In alternative embodiments, the problem statement includes the retrieved purchase information. The purchase information may include at least a date of purchase and a vendor from which the target object was purchased. In alternative embodiments, the step of selecting the applicable contact center as the contact center for the interaction and the resource within the contact center corresponding to the problem statement is further based on the purchase information. Further, the purchase information may include a warranty status related to the target object given the date purchase. In alternative embodiments, the query to the customer profile further may include determining one or more customer provided preferences regarding how the contact center should conduct return communications to the customer related to the interaction. Such preferences, for example, may include preferences related to a preferred time of day, day of the week, and/or communication channel. The customer provided preferences may be include in the problem statement so that they may be used by the contact center in routing the interaction so that the return communication complies with the customer preferences.

In alternative embodiments, the step of processing the one or more images further may include retrieving from the product database a set of correlation filters corresponding to the base object model, and a set of neural networks (NN) corresponding to the base object model, each NN included in the set of NNs that correspond to the base object model trained on images of a respective set of components of the base object model. The step of processing the one or more images further may include analyzing the one or more images of the target object uploaded by the customer using the base object model, the set of correlation filters, and the set of NNs to determine the set of changes to the target object as depicted in the one or more, including: aligning, by utilizing the at least the portion of the set of correlation filters, the base object model with an orientation of the target vehicle depicted in the one or more images based on one or more landmarks detected in the one or more images; and detecting, by utilizing one or more NNs of the set of NNs that correspond to a respective component of the target object, one or more changes to the respective component of the target object, the respective component determined based upon the aligned base object model and a depiction of the target object in the one or more images. In alternative embodiments, the step of processing the one or more images further may include generating a heat map image of the target object, the heat map image including a depiction of the target object with areas highlighted that correspond to areas on the target object having the detected set of changes. The confirmation prompt of the second interface may include the heat map image. This may allow the customer to quickly ascertain if the image processing is focused on the correct areas of the target object.

In alternative embodiments, the method may further include the step of providing an editable audiovisual interface to the customer device. The editable audiovisual interface may be configured to allow the customer to make a free hand drawing edit to the one or more images of the target object before the images are uploaded. The method may further include recording the freehand drawing edit made by the customer. For example, the freehand drawing edit may be one that indicates of a highlighted area of the base object, such as an arrow pointing to a particular region or a circle that circles a particular region. In such cases, the step of analyzing the one or more images using the base object model of the base object may include determining the highlighted area based on the freehand drawing edit and then concentrating the analysis on the highlighted area. In this way, advantages associated with the editable audiovisual interface, as provided above in relation to FIGS. 3-9, may be combined with those associated with the image processing system, as provided in relation to FIGS. 10-11. Additionally, the image processing system 1000 may be configured to processes images associated with video provided by the customer in accordance with embodiments described above in relation to FIGS. 3-9. In this way, motion associated with operation may be analyzed and compared to baseline of proper operation, for example, the drum spin rate of a washing machine or dryer.

As one of skill in the art will appreciate, the many varying features and configurations described above in relation to the several exemplary embodiments may be further selectively applied to form the other possible embodiments of the present invention. For the sake of brevity and taking into account the abilities of one of ordinary skill in the art, each of the possible iterations is not provided or discussed in detail, though all combinations and possible embodiments embraced by the several claims below or otherwise are intended to be part of the instant application. In addition, from the above description of several exemplary embodiments of the invention, those skilled in the art will perceive improvements, changes and modifications. Such improvements, changes and modifications within the skill of the art are also intended to be covered by the appended claims. Further, it should be apparent that the foregoing relates only to the described embodiments of the present application and that numerous changes and modifications may be made herein without departing from the spirit and scope of the present application as defined by the following claims and the equivalents thereof.

That which is claimed:

1. A method for facilitating an interaction for a customer with a contact center, wherein the interaction relates to a problem the customer is having with a target object, the method comprising the steps of:

generating, in response to an input by the customer, a first interface on a web-enabled customer device associated with the customer that comprises a prompt for initiating a process by which the customer uploads one or more images of the target object;

receiving the one or more images of the target object as uploaded by the customer;

processing the received one or more images, wherein the processing includes:

identifying a base object corresponding to the target object;

querying a product database based on the identified base object and retrieving therefrom data related to the base object, the retrieved data including a base object model of the base object, product identification information, and customer service information associated with the base object;

analyzing the one or more images using the base object model of the base object by comparing the one or more images of the target object to the base object model to detect a set of changes, wherein the set of changes comprises visually detectable damage to the base object;

based on the detected set of changes, determining a problem statement for the interaction;

querying, using the product identification information, a customer profile database corresponding to the customer to locate purchase information stored therein related to a purchase of the target object by the customer and one or more customer preferences and retrieving the purchase information and the one or more customer preferences, wherein:

the purchase information comprises at least a date of purchase, a vendor from which the target object was purchased, and a warranty status related to the target object given the date of purchase; and the one or more customer preferences comprise how the contact center should conduct return communications to the customer related to the interaction, including at least a time of day preference and a communication channel preference;

based on the purchase information and the problem statement, selecting an applicable contact center as the contact center for the interaction and a resource within the contact center corresponding to the problem statement;

generating a second interface on the customer device that comprises a confirmation prompt requesting confirmation from the customer as to a correctness of the problem statement; and in response to receiving an input from the customer indicating confirmation, transmitting a communication to the contact center related to initiating the interaction, wherein the communication comprises the problem statement, the purchase information, and the one or more customer preferences.

2. The method of claim 1, wherein the step of transmitting the communication to the contact center related to initiating the interaction comprises:

providing the communication to a routing server of the contact center;

selecting, from amount several candidate agents, a selected agent for receiving the interaction based, at least in part, on the problem statement and the communication channel preference of the one or more customer preferences; and transmitting, by a routing server of the contact center, a signal for routing the interaction to the selected agent of the contact center in accordance with the time of day preference of the one or more customer preferences.

3. The method of claim 2, wherein the selected agent comprises a virtual agent.

4. The method of claim 2, wherein the interaction comprises an asynchronous interaction.

5. The method of claim 2, wherein the step of identifying the base object corresponding to the target object comprises comparing the uploaded one or more images of the target object against candidate base objects to determine a match thereto;

wherein the match comprises matching the target object to the base object so to determine a particular model and year of manufacture of the target object.

6. The method of claim 2, wherein the step of processing the one or more images further comprises:

retrieving from the product database a set of correlation filters corresponding to the base object model, and a set of neural networks (NN) corresponding to the base object model, each NN included in the set of NNs that correspond to the base object model trained on images of a respective set of components of the base object model;

analyzing the one or more images of the target object uploaded by the customer using the base object model, the set of correlation filters, and the set of NNs to determine the set of changes to the target object as depicted in the one or more, including:

aligning, by utilizing the at least the portion of the set of correlation filters, the base object model with an orientation of the target vehicle depicted in the one or more images based on one or more landmarks detected in the one or more images; and detecting, by utilizing one or more NNs of the set of NNs that correspond to a respective component of the target object, one or more changes to the respective component of the target object, the respective component determined based upon the aligned base object model and a depiction of the target object in the one or more images.

7. The method of claim 6, wherein the step of processing the one or more images further comprises: generating a heat map image of the target object, the heat map image comprising a depiction of the target object with areas highlighted that correspond to areas on the target object having the detected set of changes; and wherein the confirmation prompt of the second interface comprises the heat map image.

8. The method of claim 6, further comprising the steps of:

providing an editable audiovisual interface to the customer device, the editable audiovisual interface is configured to allow the customer to make a free hand drawing edit to the one or more images of the target object before the one or more images are uploaded; and recording the freehand drawing edit made by the customer, wherein the freehand drawing edit indicates of a highlighted area of the base object; and wherein the step of analyzing the one or more images using the base object model of the base object comprises determining the highlighted area based on the freehand drawing edit and concentrating the analysis on the highlighted area.

9. A system for facilitating an interaction for a customer with a contact center, wherein the interaction relates to a problem the customer is having with a target object, the system comprising:

a processor; and a memory, wherein the memory stores instructions that, when executed by the processor, cause the processor to perform the steps of:

generating, in response to an input by the customer, a first interface on a web-enabled customer device associated with the customer that comprises a prompt for initiating a process by which the customer uploads one or more images of the target object;

receiving the one or more images of the target object as uploaded by the customer;

processing the received one or more images, wherein the processing includes:

identifying a base object corresponding to the target object;

querying a product database based on the identified base object and retrieving therefrom data related to the base object, the retrieved data including a base object model of the base object, product identification information, and customer service information associated with the base object;

analyzing the one or more images using the base object model of the base object by comparing the one or more images of the target object to the base object model to detect a set of changes, wherein the set of changes comprises visually detectable damage to the base object;

based on the detected set of changes, determining a problem statement for the interaction;

querying, using the product identification information, a customer profile database corresponding to the customer to locate purchase information stored therein related to a purchase of the target object by the customer and one or more customer preferences and retrieving the purchase information and the one or more customer preferences, wherein:
  the purchase information comprises at least a date of purchase, a vendor from which the target object was purchased, and a warranty status related to the target object given the date of purchase; and
  the one or more customer preferences comprise how the contact center should conduct return communications to the customer related to the interaction, including at least a time of day preference and a communication channel preference;
based on the purchase information and the problem statement, selecting an applicable contact center as the contact center for the interaction and a resource within the contact center corresponding to the problem statement;
generating a second interface on the customer device that comprises a confirmation prompt requesting confirmation from the customer as to a correctness of the problem statement; and
in response to receiving an input from the customer indicating confirmation, transmitting a communication to the contact center related to initiating the interaction, wherein the communication comprises the problem statement, the purchase information, and the one or more customer preferences.

10. The system of claim 9, wherein the step of transmitting the communication to the contact center related to initiating the interaction comprises:
providing the communication to a routing server of the contact center;
selecting, from amount several candidate agents, a selected agent for receiving the interaction based, at least in part, on the problem statement and the communication channel preference of the one or more customer preferences; and
transmitting, by a routing server of the contact center, a signal for routing the interaction to the selected agent of the contact center in accordance with the time of day preference of the one or more customer preferences.

11. The system of claim 10, wherein the step of identifying the base object corresponding to the target object comprises comparing the uploaded one or more images of the target object against candidate base objects to determine a match thereto;
wherein the match comprises matching the target object to the base object so to determine a particular model and year of manufacture of the target object.

12. The system of claim 10, wherein the step of processing the one or more images further comprises:
retrieving from the product database a set of correlation filters corresponding to the base object model, and a set of neural networks (NN) corresponding to the base object model, each NN included in the set of NNs that correspond to the base object model trained on images of a respective set of components of the base object model;
analyzing the one or more images of the target object uploaded by the customer using the base object model, the set of correlation filters, and the set of NNs to determine the set of changes to the target object as depicted in the one or more, including:
  aligning, by utilizing the at least the portion of the set of correlation filters, the base object model with an orientation of the target vehicle depicted in the one or more images based on one or more landmarks detected in the one or more images; and
  detecting, by utilizing one or more NNs of the set of NNs that correspond to a respective component of the target object, one or more changes to the respective component of the target object, the respective component determined based upon the aligned base object model and a depiction of the target object in the one or more images.

* * * * *